(12) United States Patent
Pareek et al.

(10) Patent No.: US 10,846,878 B2
(45) Date of Patent: *Nov. 24, 2020

(54) MULTI-AXIS EQUAL SPACING SMART GUIDES

(71) Applicant: Adobe Inc., San Jose, CA (US)

(72) Inventors: Vinay Pareek, Bikaner (IN); Mohan Sharma, Faridabad (IN)

(73) Assignee: Adobe Inc., San Jose, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/368,729

(22) Filed: Mar. 28, 2019

(65) Prior Publication Data

US 2020/0311973 A1   Oct. 1, 2020

(51) Int. Cl.
  *G06T 7/73* (2017.01)
  *G06T 7/174* (2017.01)

(52) U.S. Cl.
  CPC ............... *G06T 7/74* (2017.01); *G06T 7/174* (2017.01)

(58) Field of Classification Search
  CPC combination set(s) only.
  See application file for complete search history.

(56) References Cited

U.S. PATENT DOCUMENTS

| 10,286,907 | B2 * | 5/2019 | Nishiguchi | ......... B60W 30/162 |
| 10,427,679 | B2 * | 10/2019 | Van Dan Elzen | .... B60W 10/04 |
| 10,497,158 | B2 | 12/2019 | Jain et al. | |
| 2009/0067675 | A1 * | 3/2009 | Tan | ..................... G06K 9/00798 382/104 |
| 2012/0307059 | A1 * | 12/2012 | Yamakage | ................. G06T 7/73 348/148 |
| 2013/0063599 | A1 * | 3/2013 | Imai | .................... G06K 9/00798 348/148 |
| 2015/0227800 | A1 * | 8/2015 | Takemae | ............ G06K 9/00798 382/104 |
| 2015/0310283 | A1 * | 10/2015 | Mori | ..................... B60W 10/20 382/104 |
| 2016/0063344 | A1 * | 3/2016 | Fan | ......................... G06T 7/246 382/103 |
| 2017/0151846 | A1 * | 6/2017 | Wuergler | ................. B60D 1/62 |
| 2018/0001876 | A1 * | 1/2018 | Oikawa | ............... B60T 8/17557 |
| 2018/0374345 | A1 * | 12/2018 | Suzuki | ................. G08G 1/0112 |
| 2019/0156128 | A1 * | 5/2019 | Zhang | .................. G06K 9/6256 |
| 2019/0168752 | A1 * | 6/2019 | Suzuki | ..................... B62D 6/00 |
| 2019/0317519 | A1 * | 10/2019 | Chen | ...................... G06T 7/536 |

(Continued)

OTHER PUBLICATIONS

"Non-Final Office Action", U.S. Appl. No. 15/955,415, dated Sep. 20, 2019, 12 pages.

(Continued)

*Primary Examiner* — Cindy Trandai
(74) *Attorney, Agent, or Firm* — SBMC

(57) ABSTRACT

A smart guide display system identifies, for a subject object, a nearest candidate reference object in each of multiple directions (e.g., to the top, the right, the bottom, and the left of the subject object). The smart guide display system also determines the distance from the subject object to each of those nearest candidate reference objects. The smart guide display system displays equal spacing smart guides to the nearest candidate reference objects along two different axes if the distances between the subject object and those nearest reference objects are approximately equal.

20 Claims, 14 Drawing Sheets

(56) References Cited

U.S. PATENT DOCUMENTS

| | | |
|---|---|---|
| 2019/0317980 A1 | 10/2019 | Dhanuka et al. |
| 2019/0369626 A1* | 12/2019 | Lui .................... G05D 1/0219 |
| 2020/0062255 A1* | 2/2020 | Fernando ............ B60W 30/143 |
| 2020/0189582 A1* | 6/2020 | Fukushige ............... G08G 1/16 |

OTHER PUBLICATIONS

"Final Office Action", U.S. Appl. No. 15/955,415, dated Feb. 21, 2020, 14 pages.

"Pre-Interview First Office Action", U.S. Appl. No. 15/955,415, dated Oct. 18, 2019, 4 pages.

"Designing Type in Frontlab VI", Retrieved at: https://web.archive.org/web/20180317070815/https://help.fontlab.com/fontlab-vi/Using-Guidelines/, Mar. 17, 2018, 9 pages.

"Notice of Allowance", U.S. Appl. No. 15/955,415, dated Jun. 25, 2020, 15 pages.

"Corrected Notice of Allowability", U.S. Appl. No. 16/368,746, dated Jul. 28, 2020, 2 pages.

"Notice of Allowance", U.S. Appl. No. 16/368,746, dated Jul. 23, 2020, 8 pages.

"Notice of Allowance" issued in U.S. Appl. No. 16/368,746, dated Sep. 10, 2020, 2 pages.

\* cited by examiner

MULTI-AXIS EQUAL SPACING SMART GUIDES

BACKGROUND

As computer technology has advanced, the use of computers to create digital content has increased. Examples of this digital content includes pictures, drawings, or illustrations that are made up of multiple different objects. For example, a user may generate a picture of a musical instrument, a greeting card, a brochure to be printed or shared electronically, and so forth.

While computers facilitate the creation of digital content, the typical digital content creation process is not without its problems. One such problem is that it can be difficult for users to align the various different objects that make up the digital content. For example, a user may have already positioned two objects in the digital content and desire to place a third object equidistant from the two objects that have already been positioned. Some digital content creation programs attempt to solve this problem by displaying, in some situations, smart guides for the user that show the user where to place the object so it is aligned with other objects in the digital content. Unfortunately, the situations in which these programs display smart guides are limited. Because of these limitations, users are left with many situations for which smart guides are not displayed, leading to user frustration with their computers and digital content creation programs.

SUMMARY

To mitigate the problem of smart guides not being displayed in certain situations, a smart guide display system is employed to display multi-axis equal spacing smart guides. In accordance with one or more aspects of the smart guide display system, a first candidate reference object from a set of multiple reference objects in digital content that is in a first direction or in a second direction from a subject object is identified. This first direction and second direction are along a first axis of multiple axes. A second candidate reference object from the set of multiple reference objects that is in a third direction or a fourth direction from the subject object is also identified. This third direction and fourth direction are along a second axis of the multiple axes. The first axis is perpendicular to the second axis. A first distance, in the first direction or the second direction, between a first bounding box edge of the subject object and a bounding box edge of the first candidate reference object is determined. A second distance, in the third direction or the fourth direction, between a second bounding box edge of the subject object and a bounding box edge of the second candidate reference object is also determined, and a determination is made as to whether the first distance is within a threshold amount of the second distance. In response to the first distance being within the threshold amount of the second distance, equal spacing smart guides indicating that the subject object is approximately equidistant from both the first candidate reference object and the second candidate reference object are displayed.

In accordance with one or more aspects of the smart guide display system, the system includes means for identifying a first candidate reference object and a second candidate reference object from a set of multiple reference objects in digital content. The first candidate reference object is in a first direction or in a second direction from a subject object, the first direction and the second direction being along a first axis of multiple axes. The second candidate reference object is in a third direction or a fourth direction from the subject object, the third direction and the fourth direction being along a second axis of the multiple axes. The first axis is perpendicular to the second axis. The system also includes a distance determination module configured to determine a first distance, in the first direction or the second direction, between a first bounding box edge of the subject object and a bounding box edge of the first candidate reference object, and to determine a second distance, in the third direction or the fourth direction, between a second bounding box edge of the subject object and a bounding box edge of the second candidate reference object. The system further includes means for displaying, in response to the first distance and the second distance being approximately equal, equal spacing smart guides indicating that the subject object is approximately equidistant from both the first candidate reference object and the second candidate reference object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
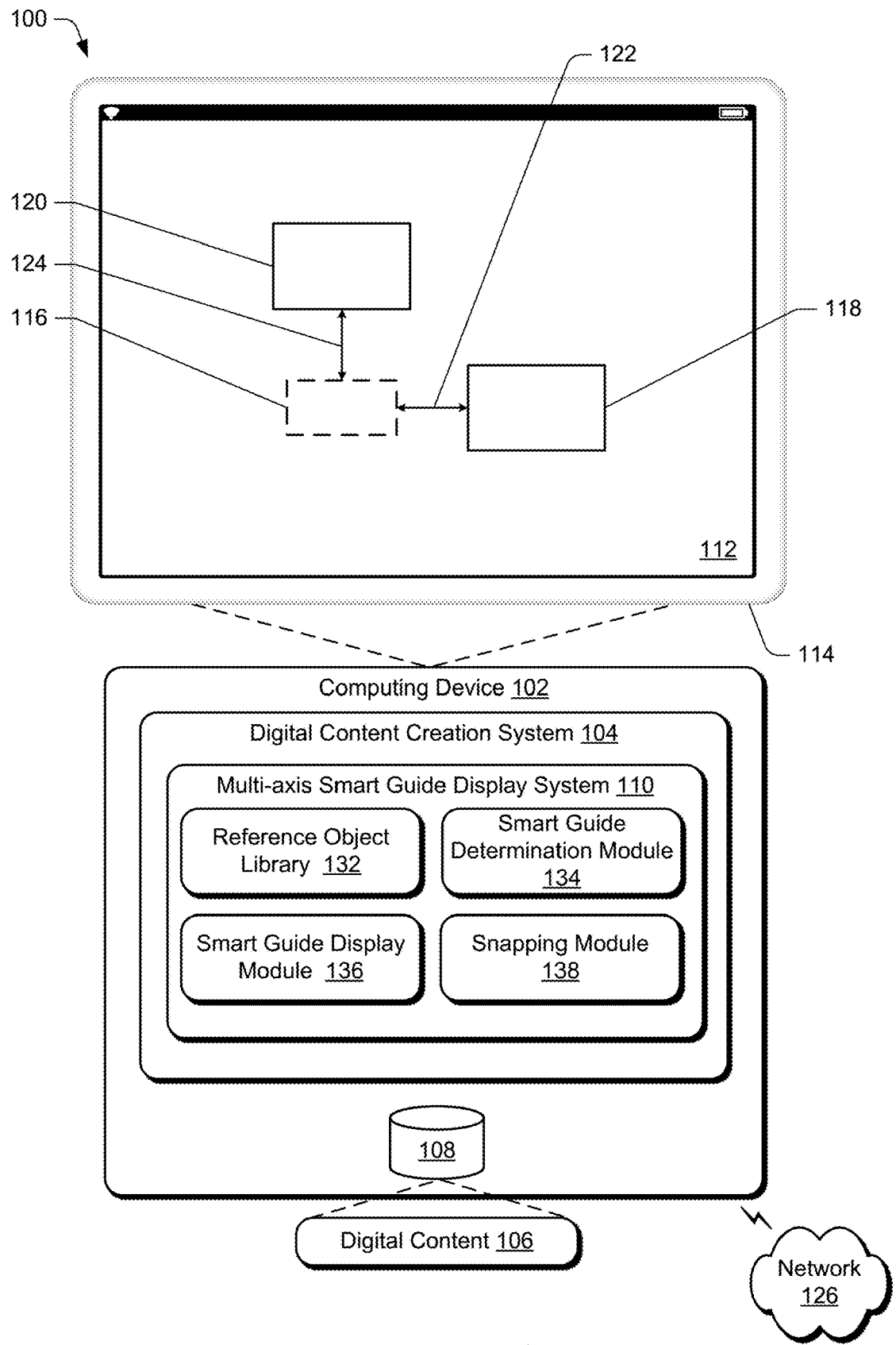
FIG. 1 is an illustration of a digital medium environment in an example implementation that is operable to employ the multi-axis equal spacing smart guides techniques described herein.

Digital content creation programs allow users to create digital content. To help users create the digital content they desire, a digital content creation program displays smart guides. Smart guides refer to displayed indicators of the relationship between an object to be placed in digital content (e.g., an object being created or positioned in the digital content), referred to as a subject object, and one or more other objects already present in the digital content that are each referred to as a reference object. These reference objects can be, for example, objects in the digital content, other than the subject object, that are currently in view. An object refers to a shape or art that can be displayed as part of digital content. For example, an object can be text, an image, a gif, a geometric shape, artwork, a freeform gradient color point, and so forth.

The subject object is an object that is currently selected by the user, and other objects in the digital content are referred to as reference objects. It should be noted that which object is the subject object can change over time. For example, when a particular object is the subject object, then another object is selected by the user, that other object becomes the subject object and the particular object becomes a reference object.

Candidate reference objects are also discussed herein. A candidate reference object is a reference object from which smart guides can be displayed based at least in part on the current location of the subject object. These candidate reference objects can be, for example, reference objects within a region of interest for a subject object bounding box.

One type of smart guide is an equal spacing smart guide that is one or more lines, arrows, or other indicators that a first object is approximately (e.g., within a threshold amount, such as 95% or 99%) an equal distance from a second object as it is from a third object, also referred to as the first object being approximately equidistant from the first object and the second object. The use of an equal spacing smart guide allows a user to quickly and easily position an object equidistant from two other objects.

Conventional digital content creation programs, however, do not display an equal spacing smart guide along multiple axes. Thus, for example, if digital content currently has a first reference object and a second reference object, and a user desires to put a subject object below the first reference object and to the right of the second reference object, an equal spacing smart guide showing when the subject object is equidistant from the bottom side of the first reference object and the right side of the second reference object is not displayed to the user. This makes it tedious for the user to position the subject object where he or she desires, causing the user to expend additional time and computational resources to get the subject object positioned where he or she desires.

To overcome these challenges, a smart guide display system identifies, for a subject object, a nearest candidate reference object in each of multiple directions (e.g., to the top, the right, the bottom, and the left of the subject object). The nearest candidate reference objects are reference objects from a set of reference objects. The smart guide display system also determines the distance from the subject object to each of those nearest candidate reference objects. The smart guide display system displays equal spacing smart guides to the nearest candidate reference objects along two different axes if the distances between the subject object and those nearest reference objects are approximately equal.

The smart guide display system determines these distances and displays equal spacing smart guides based on object bounding boxes. The bounding box of an object is a rectangular area in which the object is contained, and is typically the smallest rectangular area that, using a 2-dimensional Cartesian coordinate system has top and bottom edges that are parallel to one axis (e.g., the x-axis), and left and right edges that are parallel to the other axis (e.g., the y-axis), and contains all of the object. It should be noted that the bounding box of an object can be, but need not be, the outline of the object itself. For example, if an object is a rectangle then the bounding box of the object is that rectangle. However, if an object is in the shape of a circle, then the bounding box of the object is not that circle. Rather, the bounding box is, for example, a smallest rectangular area in which that circle is contained.

More specifically, in one or more implementations regions of interest for the subject object bounding box are identified. The regions of interest for the subject object bounding box extend outward from each edge of the bounding box to the edge of the digital content, and for each edge in a direction perpendicular to the edge of the bounding box and for the entire length of the edge of the bounding box. Reference objects with bounding boxes that at least partially overlap one of the regions of interest, but do not overlap the subject object, are identified. At least partially overlapping a region of interest refers to an object bounding box partially overlapping or being contained within the region of interest. These identified objects are referred to as candidate reference objects and are candidates for having equal spacing smart guides displayed based on the locations of the subject object and the various candidate reference objects.

For each subject object bounding box edge, the nearest candidate reference object in the corresponding direction is identified, and a distance between that edge and a nearest bounding box edge of the nearest candidate reference object is determined. If the distance from one subject object bounding box edge to the nearest candidate reference object bounding box edge along one axis is within a threshold amount (e.g., 95% or 99%) of the distance from another subject object bounding box edge to the nearest candidate reference object bounding box edge along a different axis, then equal spacing smart guides for those nearest candidate reference object bounding boxes are displayed, indicating that the subject object is approximately equidistant to those nearest candidate reference objects.

Furthermore, in some situations the distance from one subject object bounding box edge to the nearest candidate reference object bounding box edge along one axis is within a threshold amount (e.g., 95% or 99%) of, but not equal to, the distance from another subject object bounding box edge to the nearest candidate reference object bounding box edge along a different axis. In such situations the subject object can also optionally be snapped to a location so that the distances from the subject object bounding box edges to the nearest candidate reference object bounding box edges are the same.

The techniques discussed herein improve the operation of a computing device by making it easier for users to quickly and accurately create the digital content they desire. Displaying the smart guides along different axes reduces the time it takes for users to align an object with reference objects along two different axes. Additionally, snapping objects to particular locations reduces the time it takes for users to place objects at the locations the users desire. This provides for efficient use of computational resources by reducing the amount of time computational resources are expended in creating digital content. For example, as a result of the time savings the computing device need not run the digital content creation system for as long, resulting in reduced energy usage by the computing device.

Furthermore, the techniques discussed herein allow users to quickly and accurately create the digital content they desire on some computing devices that would otherwise be impractical or difficult to generate. For example, on computing devices with small displays, such as digital cameras or smart phones, the small size of the display may make it difficult for a user to interact with the device in order to accurately position objects in the digital content where they desire. By way of another example, on computing devices without certain input devices (e.g., computing devices lacking a stylus or mouse), the lack of such input devices can make it difficult for a user to interact with the device in order to accurately position objects in the digital content where they desire. These difficulties are alleviated by displaying the smart guides, and optionally snapping objects to particular locations.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the multi-axis equal spacing smart guides techniques described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 16.

The computing device 102 is illustrated as including a digital content creation system 104 that processes and transforms digital content 106, which is illustrated as maintained in storage 108 of the computing device 102. The digital content creation system 104 includes a multi-axis smart guide display system 110 that is implemented at least partially in hardware of the computing device 102 to process and transform the digital content 106. Such processing includes the placement of objects within the digital content 106, the display of smart guides (e.g., equal spacing smart guides) associated with the digital content 106, snapping objects to locations indicated by smart guides, and rendering of the objects and smart guides associated with the digital content 106 in a user interface 112 for output, e.g., by a display device 114. For example, such processing includes the placement of a subject object 116 within the digital content 106 relative to two reference objects 118 and 120, and the display of multi-axis equal spacing smart guides 122 and 124 indicating that the subject object 116 is equidistant from an edge of the reference object 118 along one axis (e.g., the x-axis) and an edge of the reference object 120 along another axis (e.g., the y-axis), respectively.

The storage 108 can be any of a variety of different types of storage, such as random access memory (RAM), Flash memory, solid state drive, magnetic disk drive, and so forth. Although illustrated as implemented locally at the computing device 102, functionality of the smart guide display system 110 may also be implemented in whole or part via functionality available via the network 126, such as part of a web service or "in the cloud."

An example of functionality incorporated by the multi-axis smart guide display system 110 to process the digital content 106 is illustrated as a reference object library 132, a smart guide determination module 134, a smart guide display module 136, and a snapping module 138. The reference object library 132 implements functionality to maintain a set of reference objects included in the digital content 106. The smart guide determination module 134 implements functionality to generate equal spacing smart guides between a subject object and reference objects in the set of reference objects. The smart guide display module 136 implements functionality to display on the display device 114 the smart guides generated by the smart guide determination module 136. The snapping module 138 implements functionality to snap a subject object to a particular location in response to the subject object being within a threshold distance of being equidistant from two reference objects.

The multi-axis smart guide display system 110 can be used to facilitate the creation of any of a variety of different types of digital content 106. For example, the digital content 106 can be a Web page and the objects can be various blocks of images, artwork, and text that is displayed on the Web page. By way of another example, the digital content 106 can be a company logo and the objects can be various blocks of shapes, images, and characters that make up the company logo. By way of yet another example, the digital content 106 can be a collection of multiple art boards and the objects can be individual art boards.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, modules, features, and concepts described in relation to different example environments, devices, components, figures, and procedures herein may be used in any suitable combinations and are not limited to the particular combinations represented by the enumerated examples in this description.

Multi-Axis Smart Guide Display System Architecture

Figure 2:
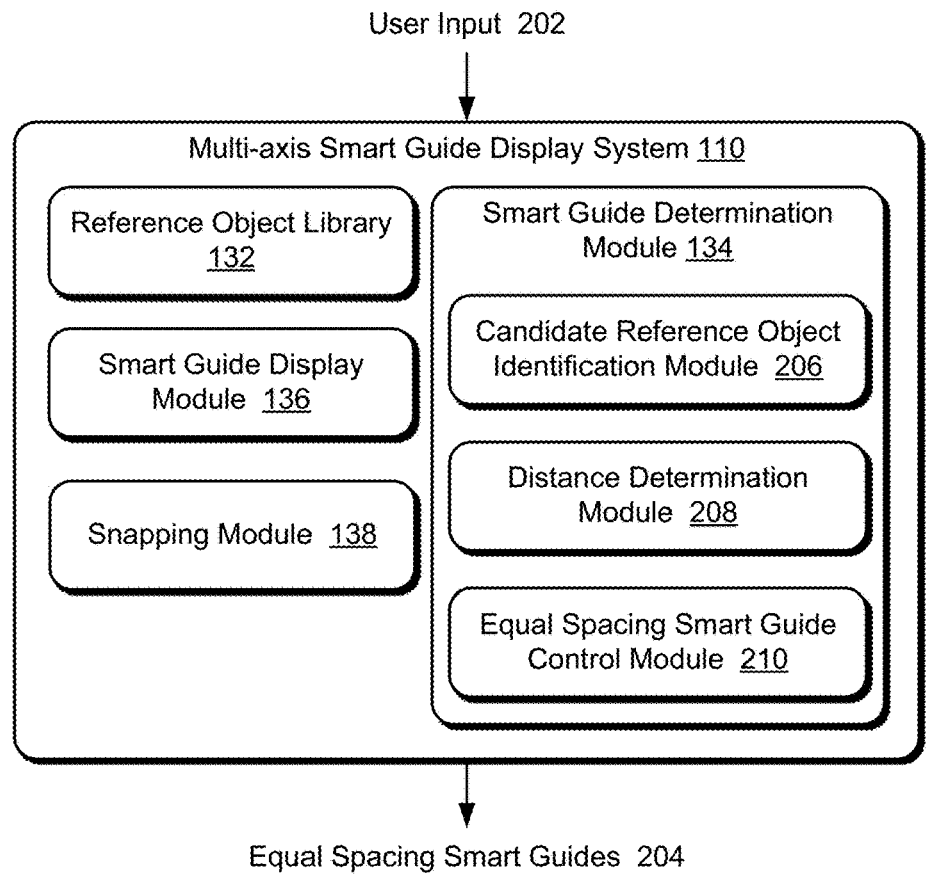
FIG. 2 is an illustration of an example architecture of a multi-axis smart guide display system.

FIG. 2 is an illustration of an example architecture of a multi-axis smart guide display system 110. The multi-axis smart guide display system 110 includes a reference object library 132, a smart guide determination module 134, a smart guide display module 136, and a snapping module 138. The multi-axis smart guide display system 110 receives user input 202 to place a subject object and implements functionality to generate and display equal spacing smart guides 204 based on the location of the subject object and reference objects of the digital content 106. The equal spacing smart guides 204 are displayed to show approximately equal distances along multiple axes, as discussed in more detail below. The user input 202 can be received in any of a variety of manners, such as movement of a finger or stylus across a touchscreen, movement of a cursor control device such as a mouse, audible inputs, and so forth.

The reference object library 132 implements functionality to maintain a set of reference objects included in the digital content 106. The reference object library 132 can maintain the reference objects in various manners, such as in a data structure in random access memory of the computing device 102, in nonvolatile memory of the computing device 102, and so forth.

The smart guide determination module 134 implements functionality to identify the nearest candidate reference object to the subject object in each direction along each of multiple axes and determine whether to display equal spacing smart guides for two or more of the candidate reference objects. The smart guide determination module 134 includes a candidate reference object identification module 206, a distance determination module 208, and an equal spacing smart guide control module 210.

The candidate reference object identification module 206 scans the various reference objects in the reference object library 132 and identifies ones of those reference objects that are within a region of interest of the subject object. Those reference objects that are within a region of interest of the subject object are referred to as candidate reference objects. Which reference objects are within a region of interest of the subject object, and the distances to those reference objects, is determined based on a bounding box of the subject object and bounding boxes of the reference objects.

Figure 3:
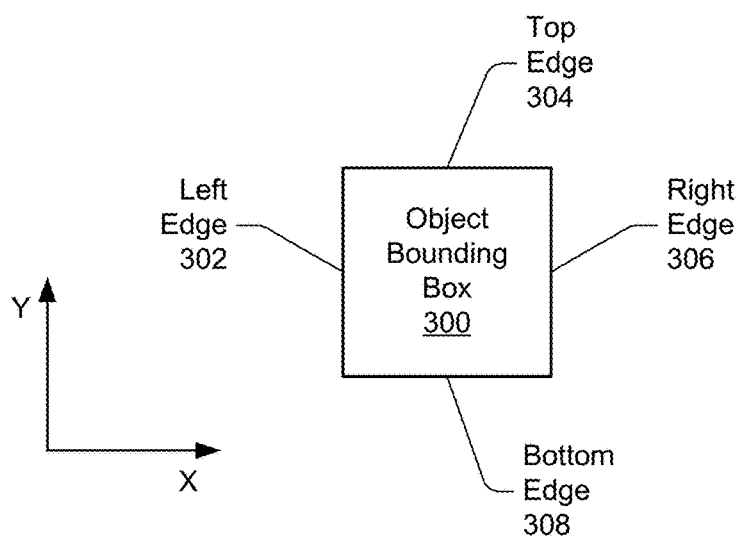
FIG. 3 illustrates an example object bounding box.

FIG. 3 illustrates an example object bounding box 300. The bounding box 300 is a rectangular area in which the object is contained, and in one or more implementations is the smallest rectangular area that contains all of the subject object. The object can be the same size and shape as the bounding box 300, or any of a variety of other geometric shapes (e.g., circles, triangles, other polygons, shapes with various arcs or curves, and so forth). In the example of FIG. 3, the object contained in the object bounding box 300 can be a subject object or a reference object.

The edges of a bounding box are the outside limits of the bounding box. The object bounding box 300 includes four edges: left edge 302, top edge 304, right edge 306, and bottom edge 308. Using a 2-dimensional Cartesian coordinate system, the top edge 304 and the bottom edge 308 are along (parallel to) one axis (e.g., the x-axis), and the left edge 302 and the right edge 306 are along (parallel to) another axis (e.g., the y-axis). Each point on the top edge 304 has the same y value but differing x values, each point on the bottom edge 308 has the same y value but differing x values, each point on the left edge 302 has the same x value but differing y values, and each point the right edge 306 has the same x value but differing y values. Directions parallel to the x-axis are also referred to herein as horizontal directions, and directions parallel to the y-axis are also referred to herein as vertical directions.

It should be noted that in some of the discussions herein reference is made to displaying smart guides based on determining distances in the horizontal and vertical directions. Horizontal and vertical directions are an example of a two-axis coordinate system, and the techniques discussed herein can be used with any multi-axis coordinate system having two axes that are perpendicular to each other.

Figure 4:
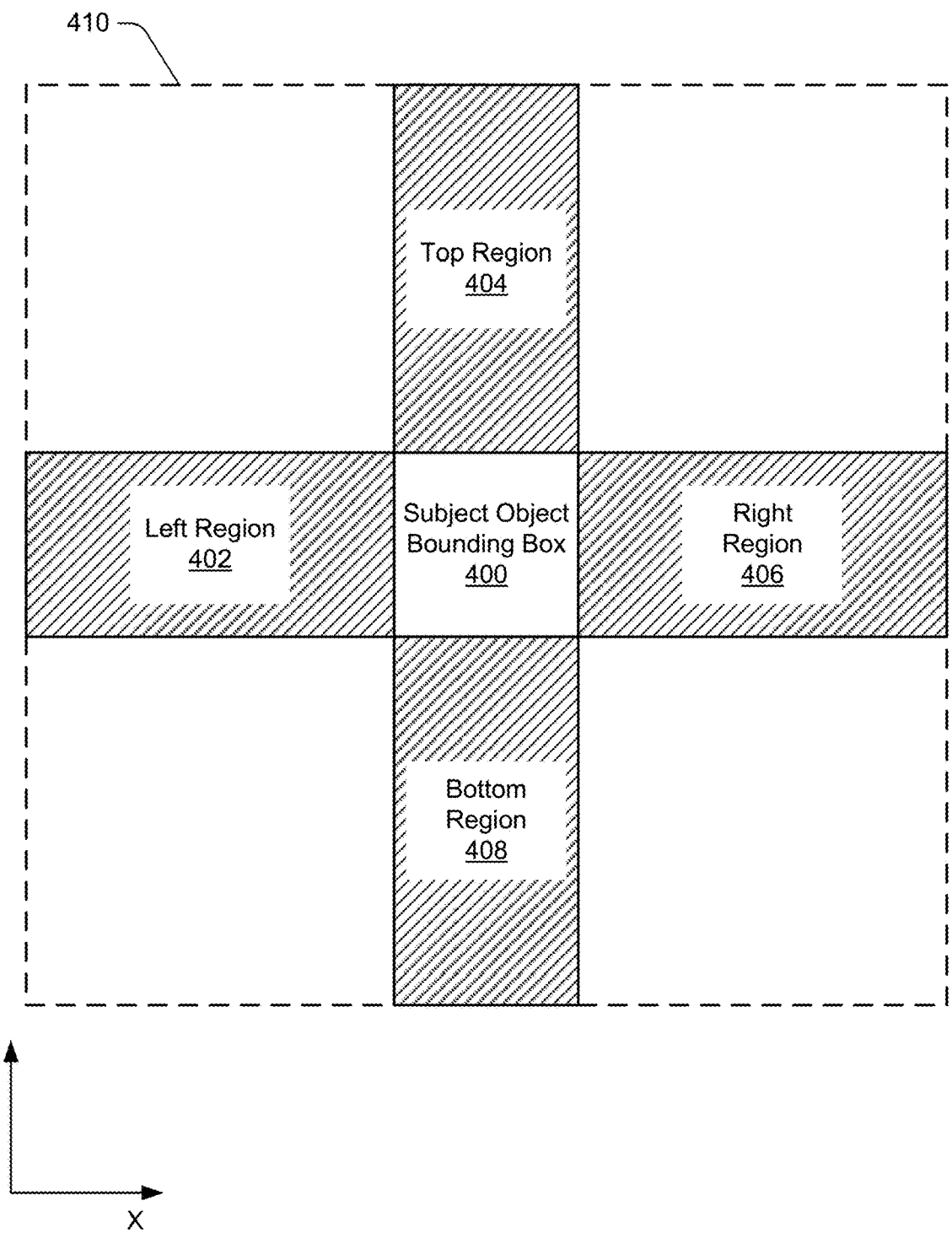
FIG. 4 illustrates an example of regions of interest for a subject object bounding box.

FIG. 4 illustrates an example of regions of interest for a subject object bounding box 400. The regions of interest for a bounding box extend outward from each edge of the bounding box to the edge of the digital content, and for each edge in a direction perpendicular to the edge of the bounding box of the subject object and for the entire length of the edge of the bounding box of the subject object. Thus, for the subject object bounding box 400, the regions of interest are shown as a left region 402, a top region 404, a right region 406, and a bottom region 408. The left region 402, illustrated with diagonal lines, is a rectangular region that extends outward from the left edge of the subject object bounding box 400 to the edge of the digital content, illustrated by dashed line 410, for the entire length of the left edge of the subject object bounding box 400. The top region 404, illustrated with diagonal lines, is a rectangular region that extends outward from the top edge of the subject object bounding box 400 to the edge of the digital content for the entire length of the top edge of the subject object bounding box 400. The right region 406, illustrated with diagonal lines, is a rectangular region that extends outward from the right edge of the subject object bounding box 400 to the edge of the digital content for the entire length of the right edge of the subject object bounding box 400. The bottom region 408, illustrated with diagonal lines, is a rectangular region that extends outward from the bottom edge of the subject object bounding box 400 to the edge of the digital content for the entire length of the bottom edge of the subject object bounding box 400.

The candidate reference object identification module 206 iterates through each reference object in the reference object library 132 and, for each reference object, determines whether the reference object bounding box at least partially overlaps one of the regions of interest. At least partially overlapping a region of interest refers to an object bounding box partially overlapping or being contained within the region of interest. A reference object that at least partially overlaps a region of interest is also referred to as being in that region of interest. These identified objects are referred to as candidate reference objects and are candidates for having equal spacing smart guides displayed based on the locations of the subject object and the various candidate reference objects.

In one or more implementations, whether a reference object is in a region of interest is determined based on the locations of the edges of the subject object and the edges of the reference objects. These locations are compared based on their x values and y values using a 2-dimensional Cartesian coordinate system. If the x value of the right edge of the reference object bounding box is not less than the x value of the left edge of the subject object bounding box, and the x value of the left edge of the reference object is not greater than the x value of the right edge of the subject object bounding box, then the reference object is in the top region 404 if the y value of the bottom edge of the reference object bounding box is greater than the y value of the top edge of the subject object bounding box, and is in the bottom region 408 if the y value of the top edge of the reference object bounding box is less than the y value of the bottom edge of the subject object bounding box. Furthermore, if the y value of the top edge of the reference object bounding box is not less than the y value of the bottom edge of the subject object bounding box, and the y value of the bottom edge of the reference object bounding box is not greater than the y value of the top edge of the subject object bounding box, then the reference object is in the left region 402 if the x value of the right edge of the reference object bounding box is less than the x value of the left edge of the subject object bounding box, and is in the right region 406 if the x value of the left edge of the reference object bounding box is greater than the x value of the right edge of the subject object bounding box.

Figure 5:
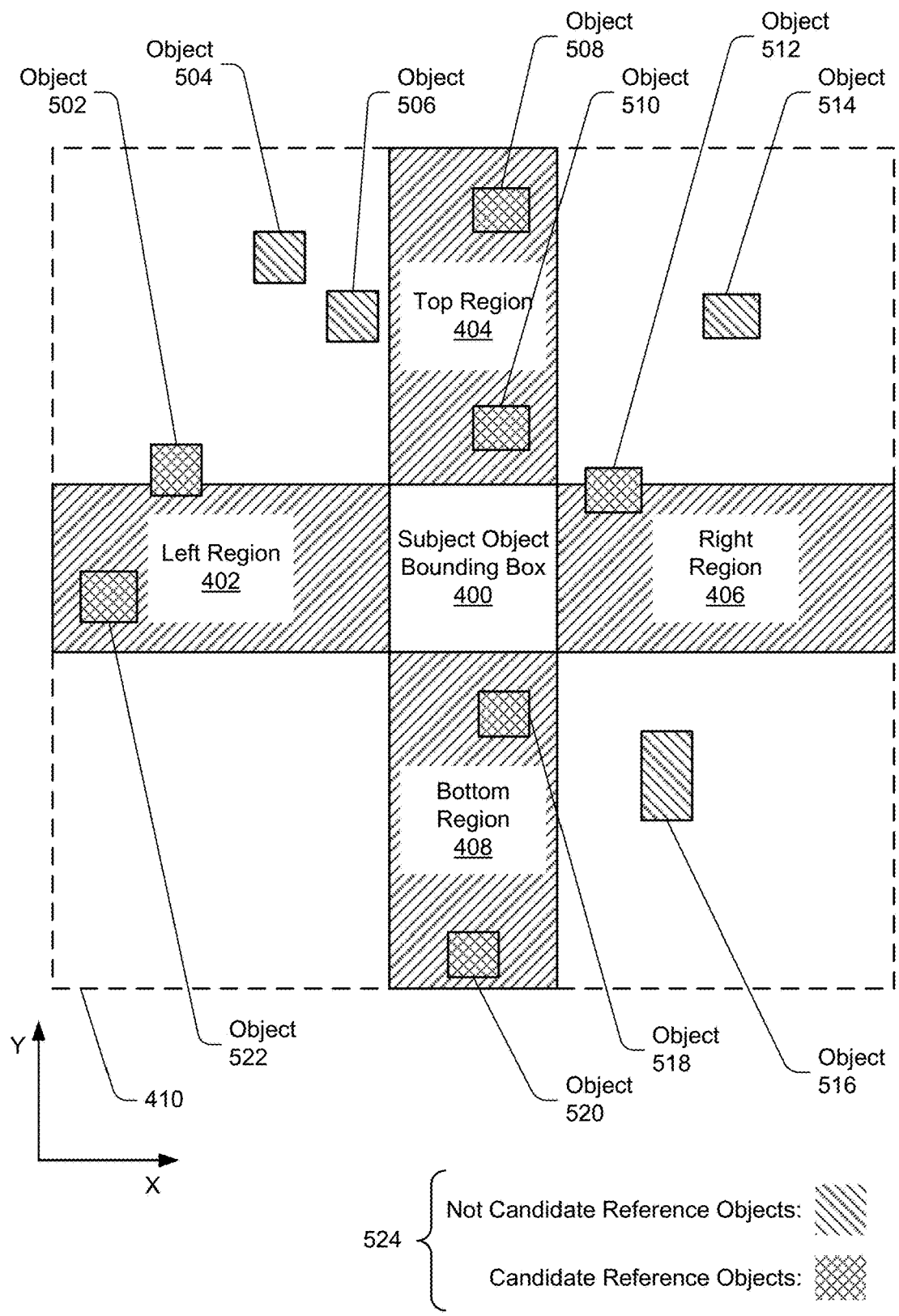
FIG. 5 illustrates an example of regions of interest and candidate reference objects for a subject object bounding box.

FIG. 5 illustrates an example of regions of interest and candidate reference objects for a subject object bounding box 400. Illustrated in FIG. 5 are the subject object bounding box 400, the left region 402, the top region 404, the right region 406, and the bottom region 408. The bounding boxes of several reference objects 502, 504, 506, 508, 510, 512, 514, 516, 518, 520, and 522 are illustrated. The bounding boxes of reference objects 502, 508, 510, 512, 518, 520, and 522 each at least partially overlap at least one of the regions 402, 404, 406, and 408. The key 524 indicates that cross-hatch fill is used to identify candidate reference objects, whereas diagonal line fill is used to identify reference objects that are not candidate reference objects. Accordingly, reference objects 502, 508, 510, 512, 518, 520, and 522, illustrated with cross-hatch fill, are candidate reference objects. Bounding boxes of reference objects 504, 506, 514, and 516 do not at least partially overlap any of the regions 402, 404, 406, and 408. Accordingly, reference objects 504, 506, 514, and 516, illustrated with diagonal line fill, are not candidate reference objects.

The distance determination module 208 identifies the nearest candidate reference object to the subject object in each direction. The nearest candidate reference object to the subject object in a particular direction is the candidate reference object in that particular direction having a bounding box edge that is parallel to the bounding box edge of the subject object and with the smallest distance to the bounding box edge of the subject object (also referred to as the candidate reference object bounding box edge that is nearest to the bounding box edge of the subject object). For example, in a 2-dimensional Cartesian coordinate system, the distance in the vertical direction is, for a given x value that is the same for the candidate reference object and the subject object, the absolute value of the difference between the y value for the candidate reference object bounding box edge and the y value of the subject object bounding box edge. By way of another example, the distance in the horizontal direction is, for a given y value that is the same for the candidate reference object bounding box edge and the subject object bounding box edge, the absolute value of the difference between the x value for the candidate reference object bounding box edge and the x value of the subject object bounding box edge. Accordingly, the sub-object generation module 134 identifies the nearest candidate reference object to the top of the subject object, the nearest candidate reference object to the left of the subject object, the nearest candidate reference object to the right of the subject object, and the nearest candidate reference object to the bottom of the subject object.

The distance determination module 208 also calculates the distance between the subject object and the nearest candidate reference object in each direction, which is also referred to as the gap distance. These distances are based on the bounding box edges of the subject object and the nearest candidate reference objects in each direction.

Given these distances, the equal spacing smart guide control module 210 determines whether the distances between two edges of the subject object and edges of each of two nearest candidate reference objects along different axes are approximately equal. If the two distances are approximately equal, then the subject object is approximately equidistant from the two candidate reference objects. Two distances being approximately equal refers to the two distances being the same or within a threshold amount (e.g., 95% or 99%) of one another. In response to determining that the two distances are approximately equal, the equal spacing smart guide control module 210 notifies the smart guide display module 136 to display equal distance smart guides for the two nearest candidate reference objects. The equal distance smart guides are one or more lines, arrows, or other indicators that the subject object is approximately equidistant from the two nearest candidate reference objects along different axes.

For example, if the equal spacing smart guide control module 210 determines that the distance between the left bounding box edge of the subject object and the right bounding box edge of the nearest candidate reference object in the left direction from the subject object is approximately equal to the distance between the top bounding box edge of the subject object and the bottom bounding box edge of the nearest candidate reference object in the top direction from the subject object, then the equal spacing smart guide control module 210 notifies the smart guide display module 136 to display equal spacing smart guides indicating that the subject object is approximately equidistant from the nearest candidate reference object in the top direction and the nearest candidate reference object in the left direction. These equal spacing smart guides can be displayed, for example, between the left bounding box edge of the subject object and the right bounding box edge of the nearest candidate reference object in the left direction and between the top bounding box edge of the subject object and the bottom bounding box edge of the nearest candidate reference object in the top direction.

The snapping module 138 implements functionality to snap a subject object to a particular location that is equidistant from two reference objects in response to the subject object not being equidistant from the two reference objects but being within a threshold distance of (e.g., 95% or 99% of) being equidistant from two reference objects. Snapping the subject object to a particular location refers to moving or changing the location of the subject object in a direction parallel to one of the multiple axes, and optionally further moving or changing the location of the subject object in a direction parallel to the other of the multiple axes. Which direction(s) to move the subject object when snapping the subject object can be determined in different manners, such as according to a particular direction priority (e.g., in the order of left, top, right, bottom). For example, if the two reference objects are to the left and top of the subject object, then the subject object is moved to the left (because left has priority over top) so that the subject object is equidistant from the two reference objects.

Additionally or alternatively, the subject object can be moved so that the larger of the two distances remains the same. For example, if the two reference objects are to the left and top of the subject object, and the distance to the top object is larger than the distance to the left object, then the subject object is moved to the right so that the subject object is equidistant from the two reference objects.

Additionally or alternatively, the subject object can be moved so that the smaller of the two distances remain the same. For example, if the two reference objects are to the left and top of the subject object, and the distance to the top object is larger than the distance to the left object, then the subject object is moved towards the top object so that the subject object is equidistant from the two reference objects.

Additionally or alternatively, the subject object can be moved in both directions so that the difference between the two distances is split. For example, if the two reference objects are to the left and top of the subject object, and the distance to the top object is larger than the distance to the left object by 4 pixels, then the subject object is moved to the right by 2 pixels (half the difference between the two distances) and towards the top object by 2 pixels (half the difference between the two distances) so that the subject object is equidistant from the two reference objects.

Thus, in addition to displaying the equal spacing smart guides indicating that the subject object is approximately equidistant from the two nearest candidate reference objects along different axes, the subject object can also be snapped to a location that is equidistant from the two reference objects.

The equal spacing smart guides can take any of a variety of different forms. For example, the equal spacing smart guides can be two lines, each with arrows at both ends and each extending from the subject object bounding box to one of the two nearest candidate reference object bounding boxes that are approximately equidistant from the subject object. The equal spacing smart guides can be displayed anywhere along the bounding box edges of the subject object and the two nearest candidate reference object bounding boxes in a given direction, or beyond one of the edges by using extension lines. The smart guide determination module 136 optionally displays extension lines from one or both of the subject object and a candidate reference object to facilitate viewing of the equal spacing smart guides. The equal spacing smart guides are optionally displayed in different manners than the reference objects or the subject object. For example, the equal spacing smart guides can be different colors than the reference objects or the subject object.

Figure 6:
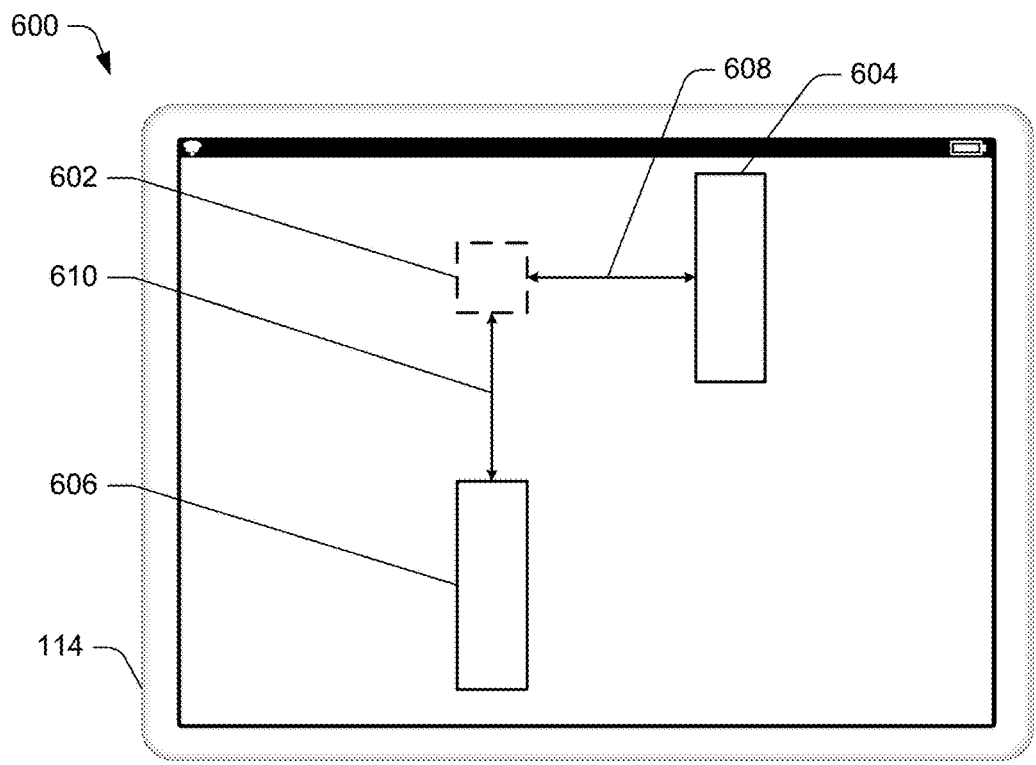
FIGS. 6, 7, 8, 9, 10, 11, 12, 13, and 14 each illustrate examples of displaying equal spacing smart guides using the techniques discussed herein.

FIG. 6 illustrates an example 600 of displaying equal spacing smart guides using the techniques discussed herein. In the example 600, a subject object bounding box 602 is displayed as to the left of a reference object 604 and above (to the top) of a reference object 606 on a display device 114. Equal spacing smart guides 608 and 610 are displayed to indicate that distance between the right edge of the subject object bounding box 602 and the left edge of the reference object bounding box 604 is approximately equal to the distance between the bottom edge of the subject object bounding box 602 and the top edge of the reference object bounding box 606. Thus, as illustrated in example 600, equal spacing smart guides can be displayed when the subject object bounding box 602 is equidistant from two reference object bounding boxes along different axes.

Figure 7:
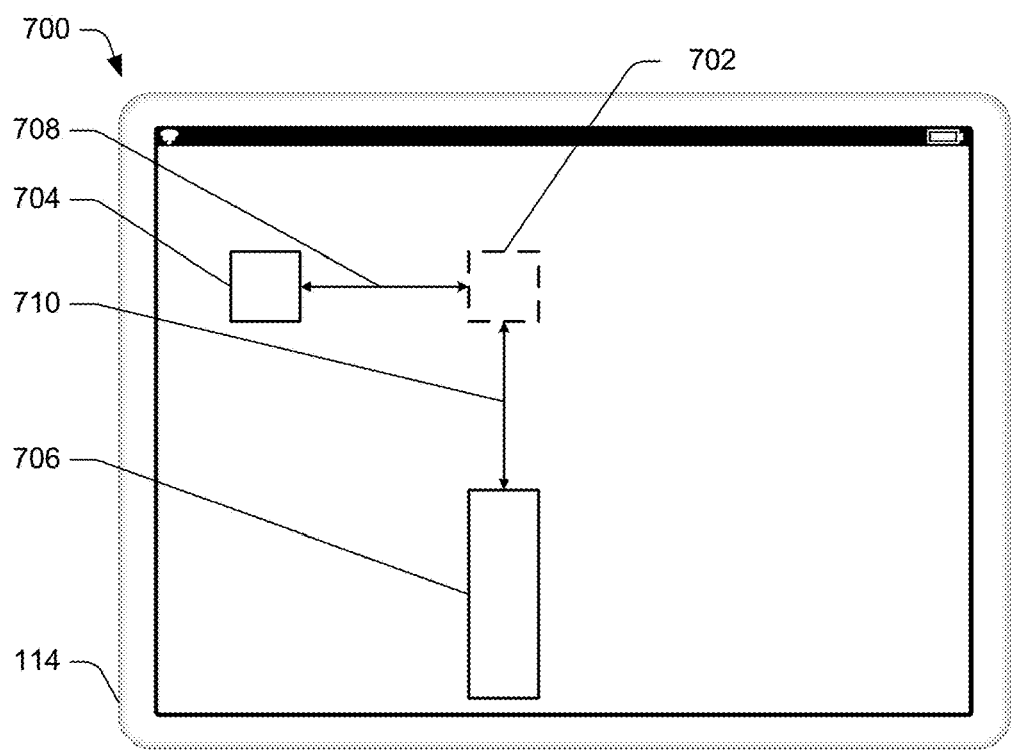

FIG. 7 illustrates an example 700 of displaying equal spacing smart guides using the techniques discussed herein. In the example 700, a subject object bounding box 702 is displayed as to the right of a reference object 704 and above (to the top) of a reference object 706 on a display device 114. Equal spacing smart guides 708 and 710 are displayed to indicate that the distance between the left edge of the subject object bounding box 702 and the right edge of the reference object bounding box 704 is approximately equal to the distance between the bottom edge of the subject object bounding box 702 and the top edge of the reference object bounding box 706. Thus, as illustrated in example 700, equal spacing smart guides can be displayed when the subject object bounding box 702 is equidistant from two reference object bounding boxes along different axes.

Figure 8:
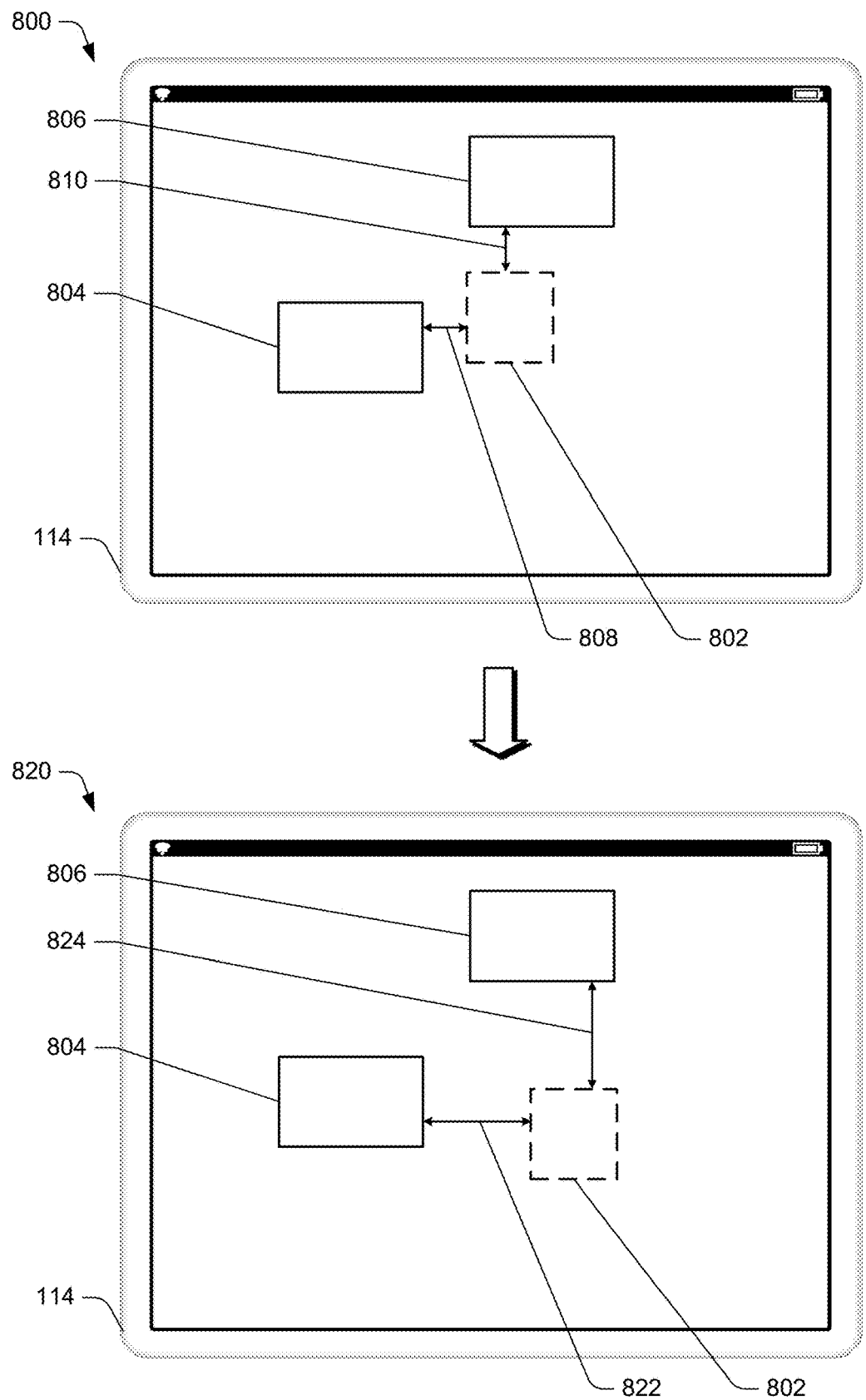

FIG. 8 illustrates another example of displaying equal spacing smart guides using the techniques discussed herein. At 800, a subject object bounding box 802 is displayed as to the right of a reference object 804 and below (to the bottom) of a reference object 806 on a display device 114. Equal spacing smart guides 808 and 810 are displayed to indicate that the distance between the left edge of the subject object bounding box 802 and the right edge of the reference object bounding box 804 is approximately equal to the distance between the top edge of the subject object bounding box 802 and the bottom edge of the reference object bounding box 806.

Furthermore, in the example 800, the subject object bounding box 802 is displayed at 820 as having moved further down and to the right (e.g., in response to a user input), while the reference objects 804 and 806 remain unmoved. Equal spacing smart guides 822 and 824 are displayed to indicate that the distance between the left edge of the subject object bounding box 802 and the right edge of the reference object bounding box 804 is still equal to the distance between the top edge of the subject object bounding box 802 and the bottom edge of the reference object bounding box 806. However, as illustrated, the distance between the left edge of the subject object bounding box 802 and the right edge of the reference object bounding box 804 as well as between the top edge of the subject object bounding box 802 and the bottom edge of the reference object bounding box 806 has increased.

Thus, as illustrated in FIG. 8, equal spacing smart guides can be displayed when the subject object bounding box 802 is equidistant from two reference object bounding boxes along different axes, and are displayed despite the user changing the location of the subject object.

Figure 9:
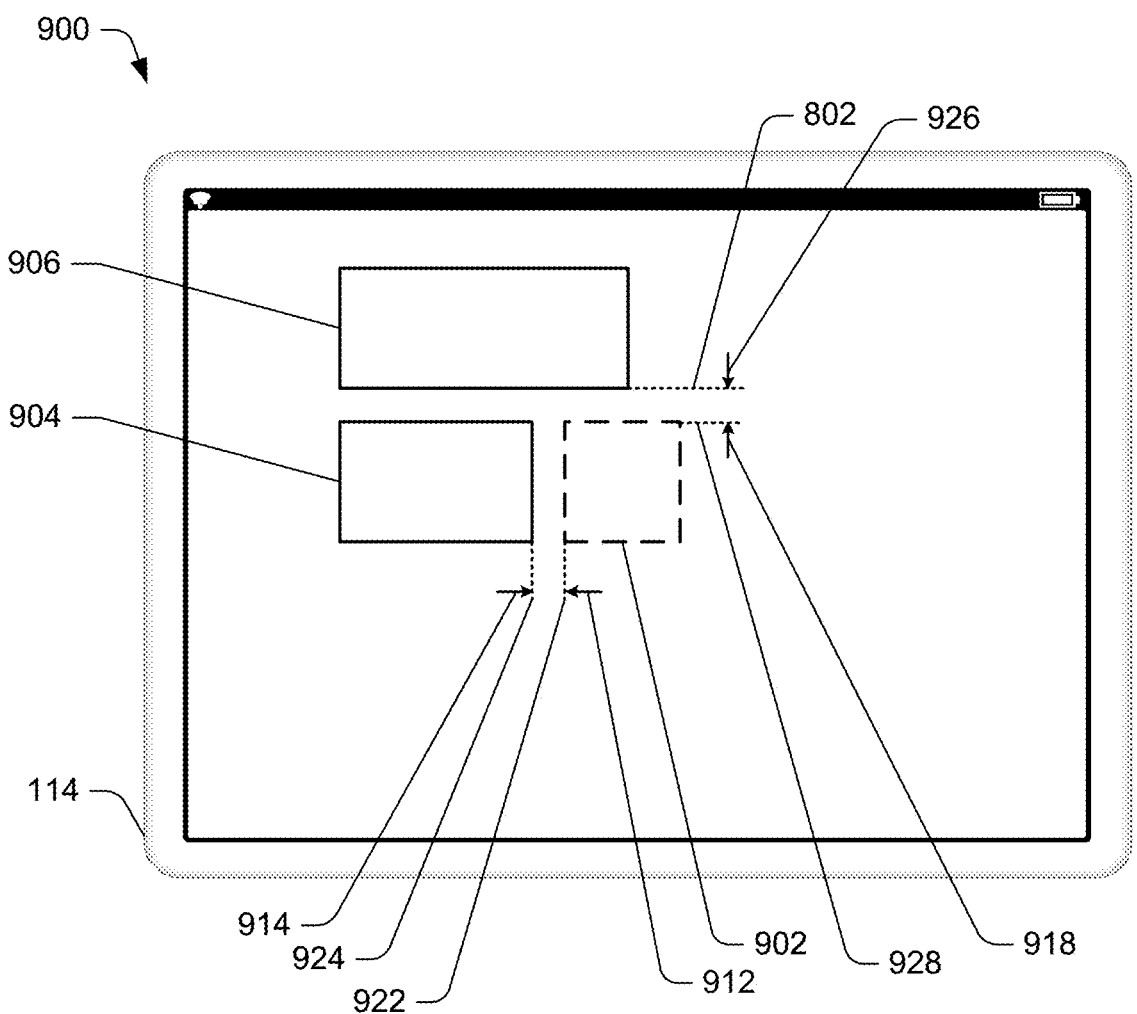

FIG. 9 illustrates an example 900 of displaying equal spacing smart guides using the techniques discussed herein. In the example 900, a subject object bounding box 902 is displayed as to the right of a reference object 904 and below (to the bottom) of a reference object 906 on a display device 114. Equal spacing smart guides 912, 914, 916, and 918 are displayed to indicate that the distance between the left edge of the subject object bounding box 902 and the right edge of the reference object bounding box 904 is approximately equal to the distance between the top edge of the subject object bounding box 902 and the bottom edge of the reference object bounding box 906. The equal spacing smart guides 912, 914, 916, and 918 are illustrated with corresponding extension lines 922, 924, 926, and 928 to facilitate viewing of the equal spacing smart guides 912, 914, 916, and 918. Thus, as illustrated in example 900, equal spacing smart guides can be displayed when the subject object bounding box 902 is equidistant from two reference object bounding boxes along different axes.

Figure 10:
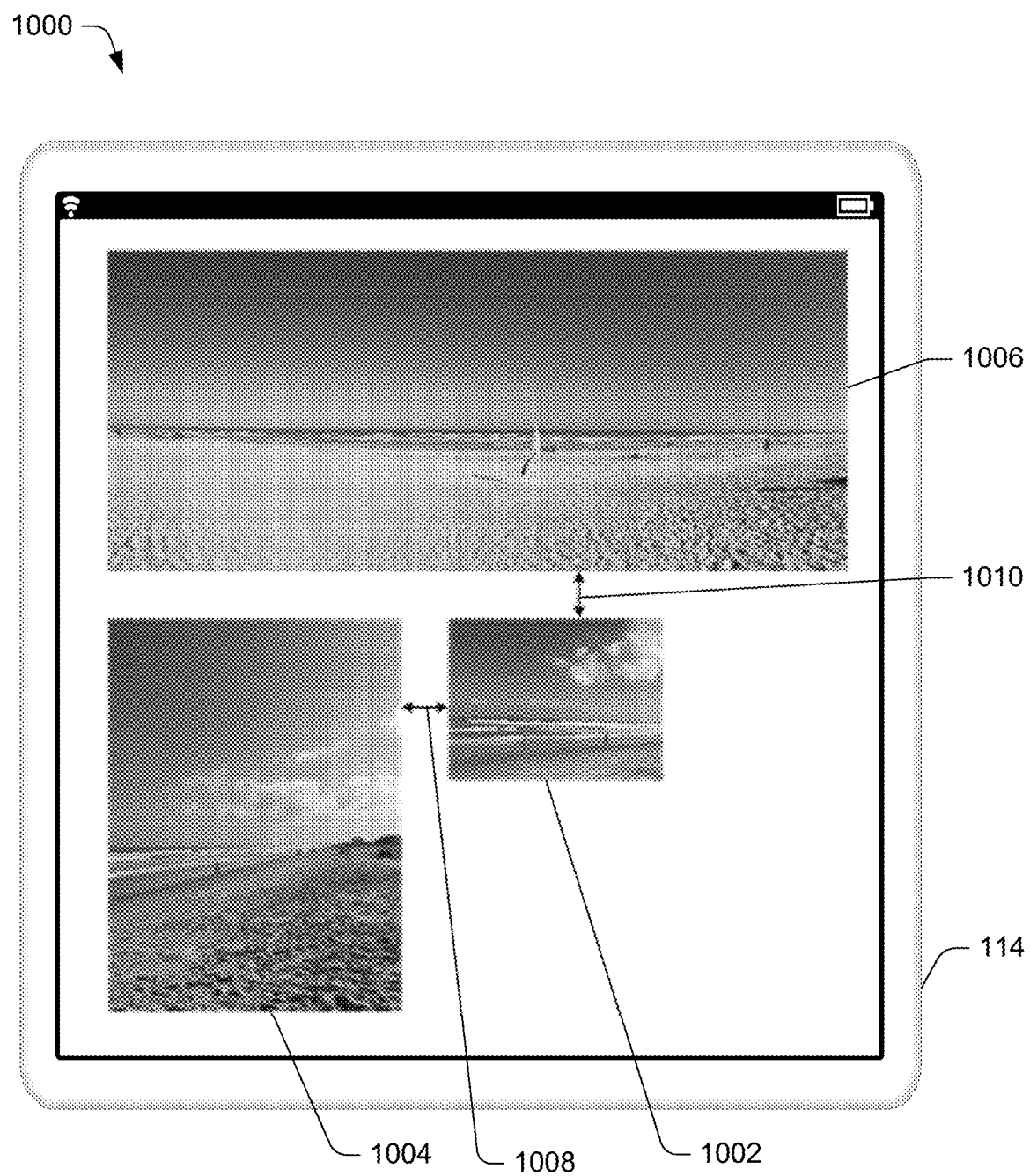

FIG. 10 illustrates an example 1000 of displaying equal spacing smart guides using the techniques discussed herein. In the example 1000, a collage is being generated from subject object 1002 and reference objects 1004 and 1006. The objects 1002, 1004, and 1006 are rectangles, so the edges of the objects are the same locations as the edges of the object bounding boxes. The subject object 1002 is displayed as to the right of the reference object 1004 and below (to the bottom) of the reference object 1006 on a display device 114. Equal spacing smart guides 1008 and 1010 are displayed to indicate that the distance between the left edge of the subject object 1002 and the right edge of the reference object 1004 is approximately equal to the distance between the top edge of the subject object 1002 the bottom edge of the reference object 1006. Thus, as illustrated in example 1000, equal spacing smart guides can be displayed to facilitate generation of digital content, such as a collage.

Returning to FIG. 2, in some situations the smart guide determination module 134 determines that the distances between the subject object and each of three nearest candidate reference objects in different directions are approximately equal. For example, the equal spacing smart guide control module 210 can determine that the distances between the subject object and each of three nearest candidate reference objects, one each in the left, top, and right directions, are approximately equal. In response to determining that the three distances are approximately equal, the equal spacing smart guide control module 210 notifies the smart guide display module 136 to display equal distance smart guides for all three candidate reference objects. The equal distance smart guides are one or more lines, arrows, or other indicators that the subject object is approximately equidistant from the three nearest candidate reference objects.

Figure 11:
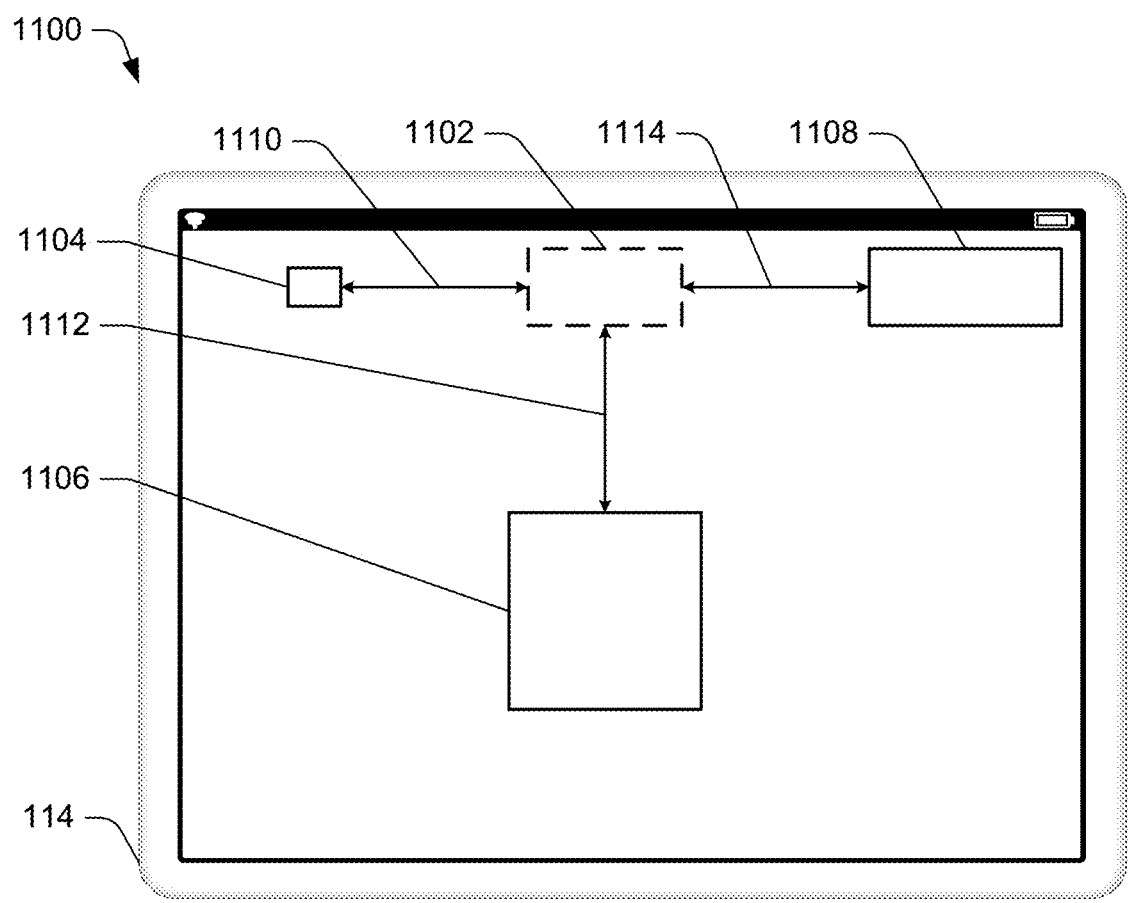

FIG. 11 illustrates an example 1100 of displaying equal spacing smart guides using the techniques discussed herein. In the example 1100, a subject object bounding box 1102 is displayed as to the right of a reference object 1104, above (to the top) of a reference object 1106, and to the left of a reference object 1108 on a display device 114. Equal spacing smart guides 1110, 1112, and 1114 are displayed to indicate that the distance between the left edge of the subject object bounding box 1102 and the right edge of the reference object bounding box 1104 is approximately equal to the distance between the bottom edge of the subject object bounding box 1102 and the top edge of the reference object bounding box 1106, and also is approximately equal to the distance between the right edge of the subject object bounding box 1102 and the left edge of the bounding box 1108. Thus, as illustrated in example 1100, equal spacing smart guides can be displayed when the subject object bounding box 1102 is equidistant from three reference object bounding boxes along two different axes.

Returning to FIG. 2, in situations in which the subject object is equidistant from three candidate reference objects, the snapping module 138 optionally snaps a subject object to a particular location that is equidistant from the three candidate reference objects in response to the subject object not being equidistant from the three candidate reference objects but being within a threshold distance of (e.g., 95% or 99% of) being equidistant from the three candidate reference objects. Which direction(s) to move the subject object when snapping the subject object to be equidistant from three candidate reference objects can be determined in different manners, such as based on whether the subject object is equidistant to two of the three candidate reference objects. If the subject object is equidistant to two of the three candidate reference objects along the same axis, then the subject object is moved so that the distance to those two candidate reference objects remains the same but becomes the same as the distance to the third candidate reference object. For example, if the three candidate reference objects are to the left, bottom, and right of the subject object, and the distance between the subject object and the left candidate reference object is equal to the distance between the subject object and the right candidate reference object, then the subject object is moved towards or away from the bottom candidate reference object so that the subject object is equidistant to all three candidate reference objects.

Additionally or alternatively, the subject object can be moved so that the largest of the three distances remains the same. For example, if the three candidate reference objects are to the left, top, and right of the subject object, and the distance to the left object is larger than the distance to the top object or the right object, then the subject object is moved to the right and away from the top object so that the subject object is equidistant from the three candidate reference objects.

Additionally or alternatively, the subject object can be moved so that the smallest of the three distances remain the same. For example, if the three candidate reference objects are to the left, top, and right of the subject object, and the distance to the left object is smaller than the distance to the top object or the right object, then the subject object is moved towards the right object and towards the top object so that the subject object is equidistant from the three candidate reference objects.

In some situations the equal spacing smart guide control module 210 determines that the distances between the subject object and a first group of two candidate reference objects along different axes is approximately equal, and the distances between the subject object and a second group of two candidate reference objects along different axes is approximately equal, but the distances from the subject object to each candidate reference object in the first group and the distances form the subject object to each candidate reference object in the second group are not approximately equal. In such situations, the smart guide determination module 134 selects one of the two groups to display equal spacing smart guides for. For example, the smart guide display system 134 can select the group having the candidate reference objects with the smallest distance to the subject object (or alternatively the group having the candidate reference objects with the largest distance to the subject object). Additionally or alternatively, the smart guide display system can display equal spacing smart guides for both groups, optionally in different manners to illustrate that the distances are different.

Figure 12:
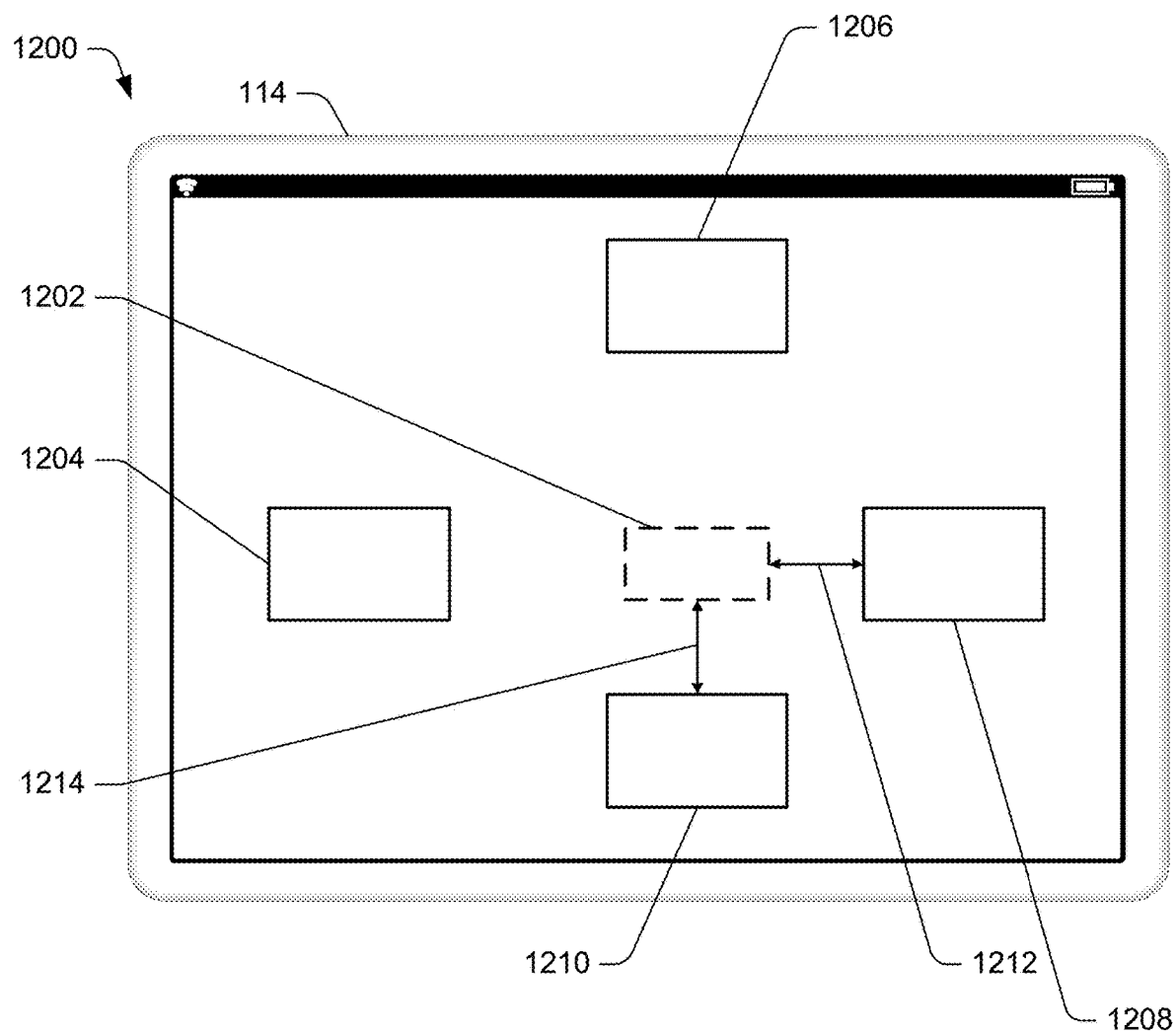

FIG. 12 illustrates an example 1200 of displaying equal spacing smart guides using the techniques discussed herein. In the example 1200, a subject object bounding box 1202 is displayed as to the right of a reference object 1204, below (to the bottom of) a reference object 1206, to the left of a reference object 1208, and above (to the top of) a reference object 1210 on a display device 114. Equal spacing smart guides 1212 and 1214 are displayed to indicate that the distance between the right edge of the subject object bounding box 1202 and the left edge of the reference object bounding box 1208 is approximately equal to the distance between the bottom edge of the subject object bounding box 1202 and the top edge of the reference object bounding box 1210. The distance between the left edge of the subject object bounding box 1202 and the right edge of the reference object bounding box 1204 is also equal to the distance between the top edge of the subject object bounding box 1202 and the bottom edge of the reference object bounding box 1206, although no equal spacing smart guides are displayed for the reference object bounding boxes 1204 and 1206. Thus, as illustrated in example 1200, equal spacing smart guides can be displayed to only two reference object bounding boxes when the subject object bounding box 1202 is equidistant from two sets of bounding boxes along two different axes.

Figure 13:
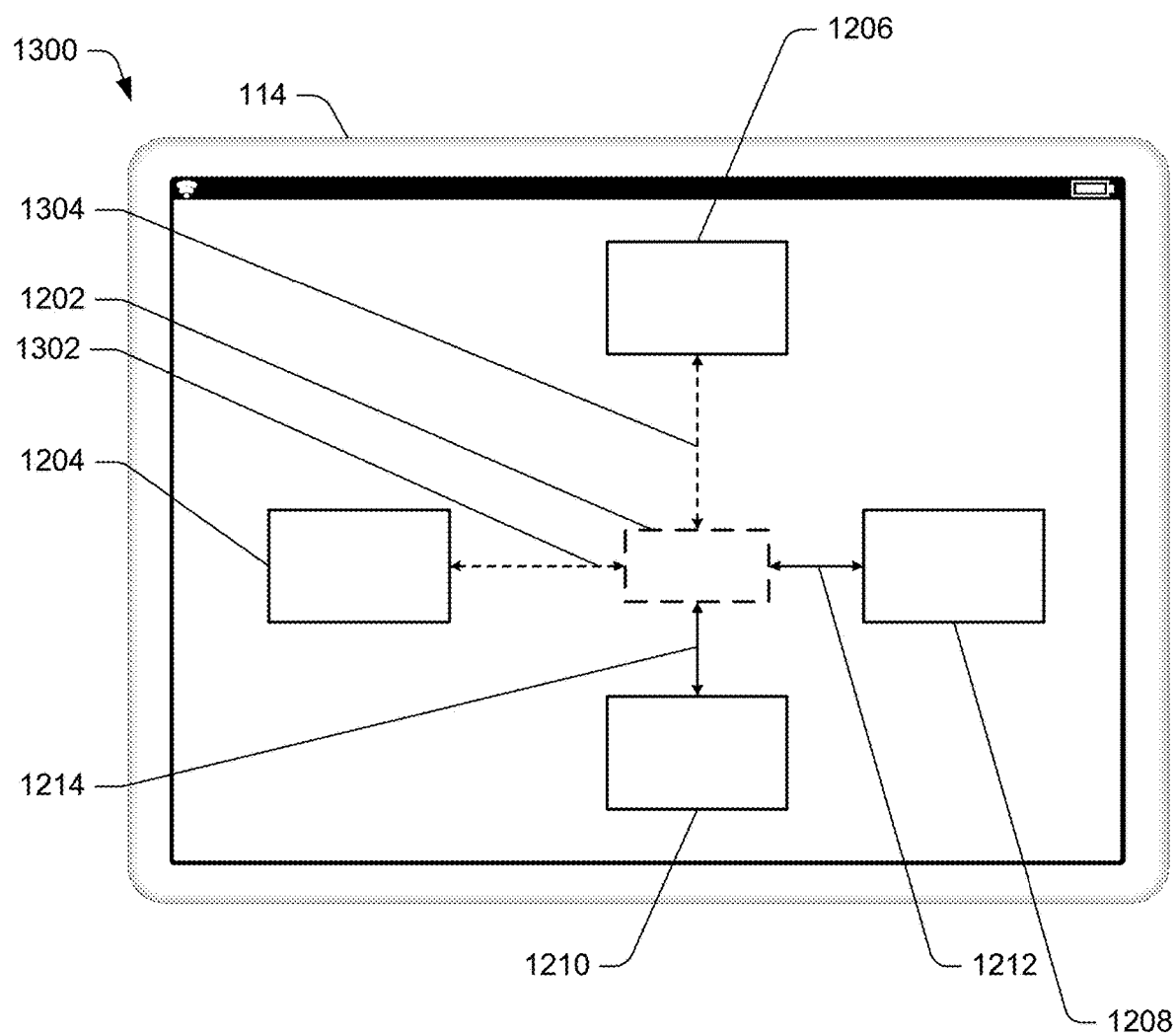

FIG. 13 illustrates an example 1300 of displaying equal spacing smart guides using the techniques discussed herein. The example 1300 is similar to the example 1200 of FIG. 12, except additional equal spacing smart guides are displayed in the example 1300. In the example 1300, the subject object bounding box 1202 is displayed as to the right of the reference object 1204, below (to the bottom of) the reference object 1206, to the left of the reference object 1208, and above (to the top of) the reference object 1210 on the display device 114. Equal spacing smart guides 1212 and 1214 are displayed to indicate that the distance between the right edge of the subject object bounding box 1202 and the left edge of the reference object bounding box 1208 is approximately equal to the distance between the bottom edge of the subject object bounding box 1202 and the top edge of the reference object bounding box 1210. Equal spacing smart guides 1302 and 1304 are also displayed to indicate that the distance between the left edge of the subject object bounding box 1202 and the right edge of the reference object bounding box 1204 is also approximately equal to the distance between the top edge of the subject object bounding box 1202 and the bottom edge of the reference object bounding box 1206. As illustrated, the distance between the subject object 1202 and each of the reference object bounding boxes 1208 and 1210 is different than the distance between the subject object 1202 and each of the reference object bounding boxes 1204 and 1206. The equal spacing smart guides 1302 and 1304 are optionally displayed in a different manner (e.g., a different color, with different arrow heads, with a broken line rather than a solid line, etc.) than the equal spacing smart guides 1212 and 1214 to indicate that the distances shown by the equal spacing smart guides 1302 and 1304 is different than the distances shown by the equal spacing smart guides 1212 and 1214.

Thus, as illustrated in example 1300, equal spacing smart guides can be displayed to each of four reference object bounding boxes when the subject object bounding box 1202 is equidistant from two sets of bounding boxes along two different axes despite the distances to the bounding boxes in those two sets being different.

Returning to FIG. 2, in some situations the equal spacing smart guide control module 210 determines that the distances between the subject object bounding box and none of the nearest candidate reference object bounding boxes are approximately equal. In such situations, the smart guide determination module 134 optionally checks additional ones of the candidate reference objects to determine whether the distance from the subject object bounding box to any of the candidate reference object bounding boxes along different axes are approximately equal. The distance determination module 208 calculated the distances to the candidate reference objects as discussed above in order to determine the nearest candidate reference object. The distance determination module 208 can maintain a record of these distances, and thus the equal spacing smart guide control module 210 can readily determine whether the distance from the subject object bounding box to any of the candidate reference object bounding boxes is approximately equal.

Figure 14:
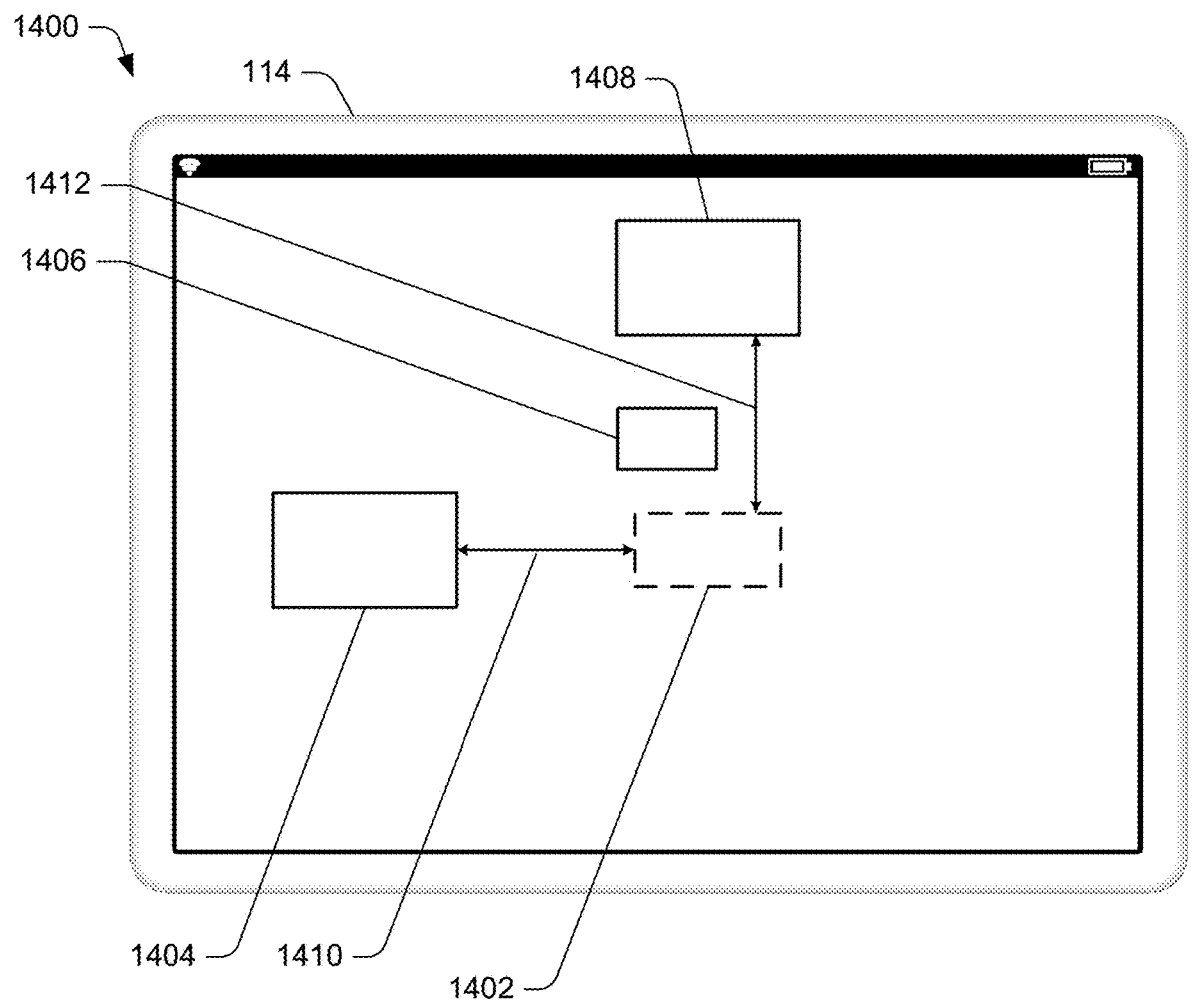

FIG. 14 illustrates an example 1400 of displaying equal spacing smart guides using the techniques discussed herein. In the example 1400, a subject object bounding box 1402 is displayed as to the right of a reference object bounding box 1404, below (to the bottom of) a reference object bounding box 1406, and below (to the bottom of) a reference object bounding box 1408 on a display device 114. The nearest candidate reference object bounding box in the left direction is candidate reference object bounding box 1404, and the nearest candidate reference object bounding box in the top direction is candidate reference object 1406. However, the distance between the left edge of the subject object bounding box 1402 and the right edge of the candidate reference object bounding box 1404 is not approximately equal to the distance between the top edge of the subject object bounding box 1402 and the bottom edge of the candidate reference object bounding box 1406. Accordingly, the equal spacing smart guide control module 210 checks the next nearest candidate reference object bounding box in the top direction, which is candidate reference object bounding box 1408. The equal spacing smart guide control module 210 determines that the distance between the left edge of the subject object bounding box 1402 and the right edge of the candidate reference object bounding box 1404 is approximately equal to the distance between the top edge of the subject object bounding box 1402 and the bottom edge of the candidate reference object bounding box 1408. Equal spacing smart guides 1410 and 1412 are displayed to indicate that the distance between the left edge of the subject object bounding box 1402 and the right edge of the reference object bounding box 1404 is approximately equal to the distance between the top edge of the subject object bounding box 1402 and the bottom edge of the reference object bounding box 1408. Thus, as illustrated in example 1400, equal spacing smart guides can be displayed to reference object bounding boxes that are not the nearest reference object bounding boxes to the subject object bounding box.

The techniques discussed herein provide an efficient approach to displaying multi-axis equal spacing smart guides. By analyzing distances to reference objects in regions of interest rather than all reference objects, the number of distances that are analyzed is reduced. Additionally, by analyzing distances to only particular edges of reference objects, the number of distances that are analyzed is reduced. Reducing the number of distances that are analyzed allows the multi-axis equal spacing smart guides to be displayed more quickly, thus improving the performance of the computing device 102.

Furthermore, the techniques discussed herein have an O(n) time complexity and an O(1) space complexity to identify which direction the reference objects are in relative to the subject object and to determine the nearest candidate reference object in each direction. The techniques discussed herein thus provide a low-complexity, efficient way to display multi-axis equal spacing smart guides.

It should be noted that the techniques discussed herein can be used on their own or in conjunction with conventional techniques for displaying smart guides. For example, the smart guide determination module 134 can implement any of a variety of public and/or proprietary techniques to display smart guides for a subject object in situations where edges of the subject object bounding box are equidistant from the edges of reference object bounding boxes along the same axis. The techniques discussed herein allow for the display of smart guides in additional situations that conventional techniques do not allow, such as when a subject object is equidistant from two reference objects along different axes.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-14.

Figure 15:
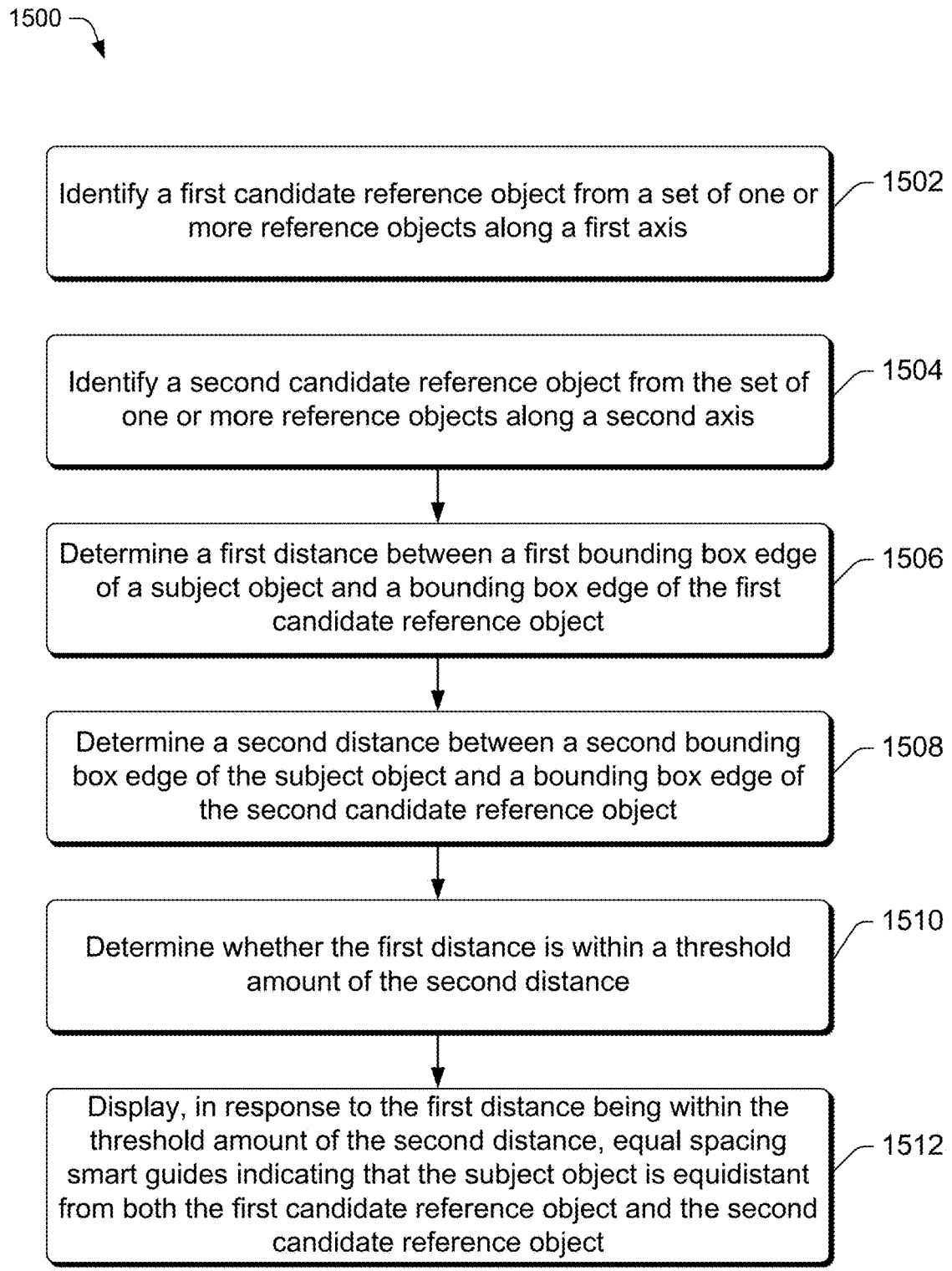
FIG. 15 is a flow diagram depicting a procedure in an example implementation of displaying smart guides for object placement based on sub-objects of reference objects.

FIG. 15 is a flow diagram depicting a procedure in an example implementation of displaying smart guides for object placement based on sub-objects of reference objects. In this example, a first candidate reference object from a set of one or more reference objects is identified (block 1502). The first candidate reference object is in a region of interest in a first direction along a first axis.

A second candidate reference object from the set of one or more reference objects is also identified (block 1504). The second candidate reference object is in a region of interest in a second direction along a second axis, with the first axis being perpendicular to the second axis.

A first distance between a first bounding box edge of a subject object and a bounding box edge of the first candidate reference object is determined (block 1506). This first distance is in the first direction.

A second distance between a second bounding box edge of the subject object and a bounding box edge of the second candidate reference object is also determined (block 1508). This second distance is in the second direction.

A determination is made whether the first distance is within a threshold amount of the second distance (block 1510). This threshold amount can be, for example, 95% or 99% of the second distance.

Equal spacing smart guides are displayed in response to the first distance being within the threshold amount of the second distance (block 1512). The equal spacing smart guides indicate that the subject object is approximately equidistant from both the first candidate reference object and the second candidate reference object.

The procedure of FIG. 15 can be performed at any of a variety of different times. For example, the procedure can be performed at the time that a subject object in the digital content is created, in response to smart guide functionality being enabled for the digital content, in response to movement of the subject object by the user, and so forth.

Example System and Device

Figure 16:
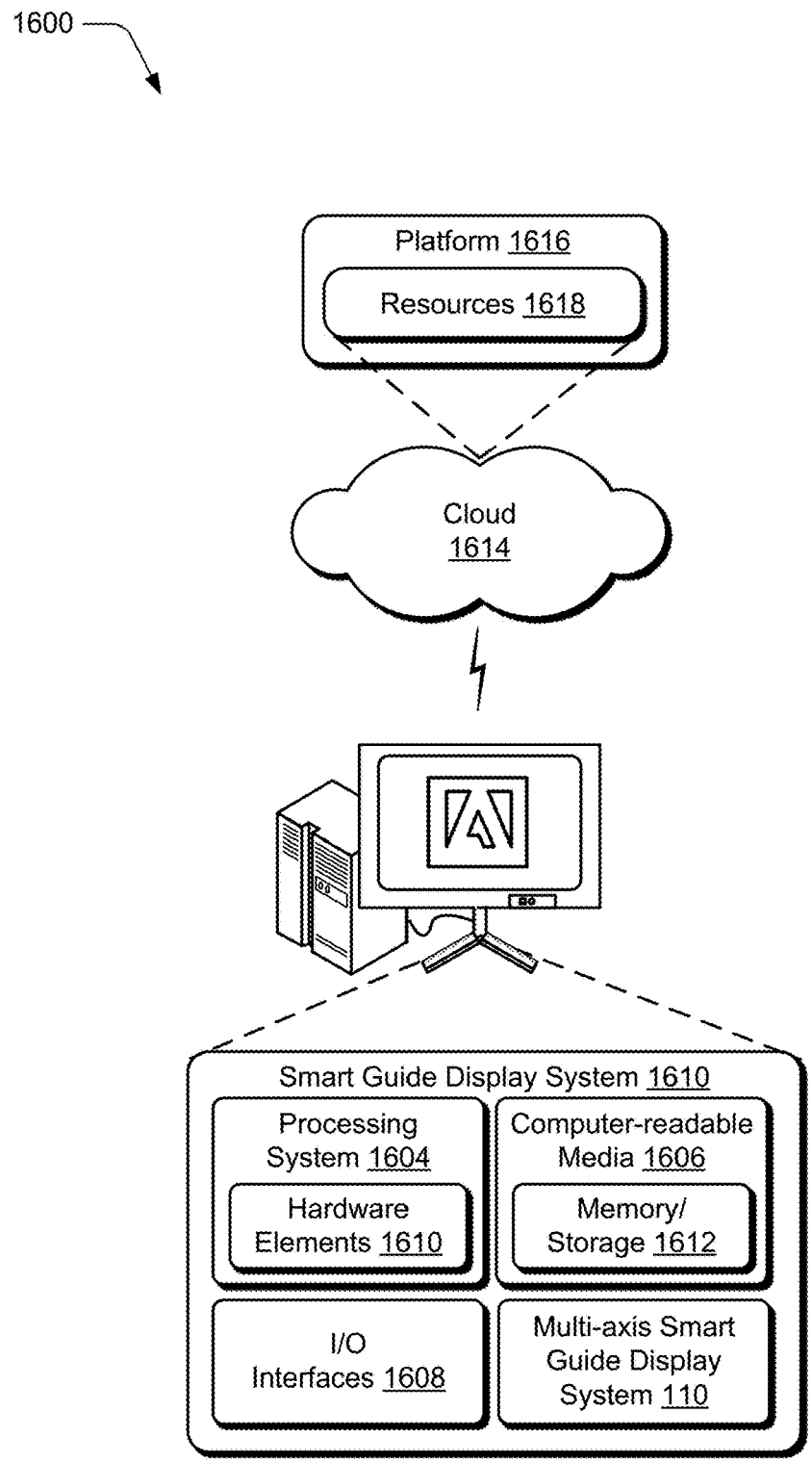
FIG. 16 illustrates an example system including various components of an example device that can be implemented as any type of computing device as described and/or utilize with reference to FIGS. 1-15 to implement aspects of the techniques described herein.

FIG. 16 illustrates an example system generally at 1600 that includes an example computing device 1602 that is representative of one or more computing systems and/or devices that may implement the various techniques described herein. This is illustrated through inclusion of the multi-axis smart guide display system 110. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources 1618 that are implemented via the platform 1616. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate digital content, a method implemented by at least one computing device, the method comprising:
    identifying a first candidate reference object from a set of multiple reference objects in digital content that is in a first direction or in a second direction from a subject object, the first direction and the second direction being along a first axis of multiple axes;
    identifying a second candidate reference object from the set of multiple reference objects that is in a third direction or a fourth direction from the subject object, the third direction and the fourth direction being along a second axis of the multiple axes, the first axis being perpendicular to the second axis;
    determining a first distance, in the first direction or the second direction, between a first bounding box edge of the subject object and a bounding box edge of the first candidate reference object;
    determining a second distance, in the third direction or the fourth direction, between a second bounding box edge of the subject object and a bounding box edge of the second candidate reference object;
    determining whether the first distance is within a threshold amount of the second distance; and
    displaying, in response to the first distance being within the threshold amount of the second distance, equal spacing smart guides indicating that the subject object is approximately equidistant from both the first candidate reference object and the second candidate reference object.

2. The method as recited in claim 1, wherein the first direction comprises a top direction, the second direction comprises a bottom direction, the third direction comprises a left direction, and the fourth direction comprises a right direction.

3. The method as recited in claim 2, wherein the first candidate reference object is a nearest candidate reference object to the subject object in the top direction, the method further comprising:

identifying a third candidate reference object from the set of multiple reference objects that is a nearest reference object to the subject object in the bottom direction;

determining a third distance in the bottom direction between a third bounding box edge of the subject object and a bounding box edge of the third candidate reference object;

determining whether the third distance is within the threshold amount of the first distance and the second distance; and displaying, in response to the third distance being within the threshold amount of the first distance and the second distance, equal spacing smart guides indicating that the subject object is approximately equidistant from the first candidate reference object, the second candidate reference object, and the third candidate reference object.

4. The method as recited in claim 3, wherein the nearest candidate reference object to the subject object in the top direction is a candidate reference object having a bottom bounding box edge nearest to the first bounding box edge of the subject object, and the nearest candidate reference object to the subject object in the bottom direction is a candidate reference object having a top bounding box edge nearest to the third bounding box edge of the subject object.

5. The method as recited in claim 2, wherein the second candidate reference object is a nearest candidate reference object to the subject object in the left direction, the method further comprising:

identifying a third candidate reference object from the set of multiple reference objects that is a nearest candidate reference object to the subject object in the right direction;

determining a third distance in the right direction between a third bounding box edge of the subject object and a bounding box edge of the third candidate reference object;

determining whether the third distance is within the threshold amount of the first distance and the second distance; and displaying, in response to the third distance being within the threshold amount of the first distance and the second distance, equal spacing smart guides indicating that the subject object is approximately equidistant from the first candidate reference object, the second candidate reference object, and the third candidate reference object.

6. The method as recited in claim 5, wherein the nearest candidate reference object to the subject object in the left direction is a candidate reference object having a right bounding box edge nearest to the second bounding box edge of the subject object, and the nearest candidate reference object to the subject object in the right direction is a candidate reference object having a left bounding box edge nearest to the third bounding box edge of the subject object.

7. The method as recited in claim 1, wherein the determining whether the first distance is within a threshold amount of the second distance further comprises:

determining that the first distance is within the threshold amount of the second distance but that the first distance is not equal to the second distance; and snapping the subject object to a location so that the first distance is equal to the second distance.

8. The method as recited in claim 1, wherein the first candidate reference object is a nearest candidate reference object to the subject object in the first direction, the second candidate reference object is a nearest candidate reference object to the subject object in the third direction, the method further comprising:

identifying a third candidate reference object from the set of multiple reference objects that is a nearest reference object to the subject object in the second direction;

identifying a fourth candidate reference object from the set of multiple reference objects that is a nearest candidate reference object to the subject object in the fourth direction;

determining a third distance in the second direction between a third bounding box edge of the subject object and a bounding box edge of the third candidate reference object;

determining a fourth distance in the fourth direction between a fourth bounding box edge of the subject object and a bounding box edge of the fourth candidate reference object;

determining whether the third distance is within a threshold amount of the fourth distance;

determining whether the third distance is not within the threshold amount of the first distance; and displaying, in response to the third distance being within the threshold amount of the fourth distance but not within the threshold amount of the first distance, equal spacing smart guides indicating that the subject object is approximately equidistant from the third candidate reference object and the fourth candidate reference object.

9. The method as recited in claim 1, wherein:

the first bounding box edge of the subject object has a corresponding first region of interest, the first region of interest extending outward from the first bounding box edge of the subject object to an edge of the digital content, in a direction perpendicular to the first bounding box edge of the subject object and for a length of the first bounding box edge of the subject object;

the second bounding box edge of the subject object has a corresponding second region of interest, the second region of interest extending outward from the second bounding box edge of the subject object to an edge of the digital content, in a direction perpendicular to the second bounding box edge of the subject object and for a length of the second bounding box edge of the subject object;

a third bounding box edge of the subject object has a corresponding third region of interest, the third region of interest extending outward from the third bounding box edge of the subject object to an edge of the digital content, in a direction perpendicular to the third bounding box edge of the subject object and for a length of the third bounding box edge of the subject object;

a fourth bounding box edge of the subject object has a corresponding fourth region of interest, the fourth region of interest extending outward from the fourth bounding box edge of the subject object to an edge of the digital content, in a direction perpendicular to the fourth bounding box edge of the subject object and for a length of the fourth bounding box edge of the subject object;

the first candidate reference object at least partially overlaps the first region of interest or the third region of interest; and the second candidate reference object at least partially overlaps the second region of interest or the fourth region of interest.

10. In a digital medium environment to generate digital content, a computing device comprising:
a processor; and
computer-readable storage media having stored thereon multiple instructions that, responsive to execution by the processor, cause the processor to perform operations including:
identifying a first candidate reference object from a set of multiple reference objects in digital content that is in a first direction or in a second direction from a subject object, the first direction and the second direction being along a first axis of multiple axes;
identifying a second candidate reference object from the set of multiple reference objects that is in a third direction or a fourth direction from the subject object, the third direction and the fourth direction being along a second axis of the multiple axes, the first axis being perpendicular to the second axis;
determining a first distance, in the first direction or the second direction, between a first bounding box edge of the subject object and a bounding box edge of the first candidate reference object;
determining a second distance, in the third direction or the fourth direction, between a second bounding box edge of the subject object and a bounding box edge of the second candidate reference object;
determining whether the first distance is within a threshold amount of the second distance; and
displaying, in response to the first distance being within the threshold amount of the second distance, equal spacing smart guides between the first bounding box edge of the subject object and the bounding box edge of the first candidate reference object, and between the second bounding box edge of the subject object and the bounding box edge of the second candidate reference object.

11. The computing device as recited in claim 10, wherein the first direction comprises a top direction, the second direction comprises a bottom direction, the third direction comprises a left direction, and the fourth direction comprises a right direction.

12. The computing device as recited in claim 11, wherein the first candidate reference object is a nearest candidate reference object to the subject object in the top direction, the operations further comprising:
identifying a third candidate reference object from the set of multiple reference objects that is a nearest reference object to the subject object in the bottom direction;
determining a third distance in the bottom direction between a third bounding box edge of the subject object and a bounding box edge of the third candidate reference object;
determining whether the third distance is within the threshold amount of the first distance and the second distance; and
displaying, in response to the third distance being within the threshold amount of the first distance and the second distance, equal spacing smart guides between the third bounding box edge of the subject object and the bounding box edge of the third candidate reference object.

13. The computing device as recited in claim 12, wherein the nearest candidate reference object to the subject object in the top direction is a candidate reference object having a bottom bounding box edge nearest to the first bounding box edge of the subject object, and the nearest candidate reference object to the subject object in the bottom direction is a candidate reference object having a top bounding box edge nearest to the third bounding box edge of the subject object.

14. The computing device as recited in claim 11, wherein the second candidate reference object is a nearest candidate reference object to the subject object in the left direction, the operations further comprising:
identifying a third candidate reference object from the set of multiple reference objects that is a nearest candidate reference object to the subject object in the right direction;
determining a third distance in the right direction between a third bounding box edge of the subject object and a bounding box edge of the third candidate reference object;
determining whether the third distance is within the threshold amount of the first distance and the second distance; and
displaying, in response to the third distance being within the threshold amount of the first distance and the second distance, equal spacing smart guides between the third bounding box edge of the subject object and the bounding box edge of the third candidate reference object.

15. The computing device as recited in claim 14, wherein the nearest candidate reference object to the subject object in the left direction is a candidate reference object having a right bounding box edge nearest to the second bounding box edge of the subject object, and the nearest candidate reference object to the subject object in the right direction is a candidate reference object having a left bounding box edge nearest to the third bounding box edge of the subject object.

16. The computing device as recited in claim 10, wherein the determining whether the first distance is within a threshold amount of the second distance further comprises:
determining that the first distance is within the threshold amount of the second distance but that the first distance is not equal to the second distance; and
snapping the subject object to a location that so that the first distance is equal to the second distance.

17. In a digital medium environment to generate digital content, a system comprising:
means for identifying a first candidate reference object and a second candidate reference object from a set of multiple reference objects in digital content, wherein the first candidate reference object is in a first direction or in a second direction from a subject object, the first direction and the second direction are along a first axis of multiple axes, the second candidate reference object is in a third direction or a fourth direction from the subject object, the third direction and the fourth direction are along a second axis of the multiple axes, and the first axis is perpendicular to the second axis;
a distance determination module configured to determine a first distance, in the first direction or the second direction, between a first bounding box edge of the subject object and a bounding box edge of the first candidate reference object, and to determine a second distance, in the third direction or the fourth direction, between a second bounding box edge of the subject object and a bounding box edge of the second candidate reference object; and
means for displaying, in response to the first distance and the second distance being approximately equal, equal spacing smart guides indicating that the subject object is approximately equidistant from both the first candidate reference object and the second candidate reference object.

18. The system as recited in claim 17, wherein:
the first bounding box edge of the subject object has a corresponding first region of interest, the first region of interest extending outward from the first bounding box edge of the subject object to an edge of the digital content, in a direction perpendicular to the first bounding box edge of the subject object and for a length of the first bounding box edge of the subject object;
the second bounding box edge of the subject object has a corresponding second region of interest, the second region of interest extending outward from the second bounding box edge of the subject object to an edge of the digital content, in a direction perpendicular to the second bounding box edge of the subject object and for a length of the second bounding box edge of the subject object;
a third bounding box edge of the subject object has a corresponding third region of interest, the third region of interest extending outward from the third bounding box edge of the subject object to an edge of the digital content, in a direction perpendicular to the third bounding box edge of the subject object and for a length of the third bounding box edge of the subject object;
a fourth bounding box edge of the subject object has a corresponding fourth region of interest, the fourth region of interest extending outward from the fourth bounding box edge of the subject object to an edge of the digital content, in a direction perpendicular to the fourth bounding box edge of the subject object and for a length of the fourth bounding box edge of the subject object;
the first candidate reference object at least partially overlaps the first region of interest or the third region of interest; and
the second candidate reference object each at least partially overlaps the second region of interest or the fourth region of interest.

19. The system as recited in claim 17, wherein the first direction comprises a top direction, the second direction comprises a bottom direction, the third direction comprises a left direction, and the fourth direction comprises a right direction, the first candidate reference object is a nearest candidate reference object to the subject object in the top direction, and wherein:

the means for identifying is further for identifying a third candidate reference object from the set of multiple reference objects that is a nearest reference object to the subject object in the bottom direction;
the distance determination module is further configured to determine a third distance in the bottom direction between a third bounding box edge of the subject object and a bounding box edge of the third candidate reference object; and
the means for displaying further includes means for displaying, in response to the first distance and the third distance being approximately equal, equal spacing smart guides indicating that the subject object is approximately equidistant from the first candidate reference object, the second candidate reference object, and the third candidate reference object.

20. The system as recited in claim 17, wherein the first direction comprises a top direction, the second direction comprises a bottom direction, the third direction comprises a left direction, and the fourth direction comprises a right direction, the first candidate reference object is a nearest candidate reference object to the subject object in the top direction, the second candidate reference object is a nearest candidate reference object to the subject object in the left direction, and wherein:
the means for identifying is further for identifying a third candidate reference object from the set of multiple reference objects that is a nearest candidate reference object to the subject object in the right direction;
the distance determination module is further configured to determine a third distance in the right direction between a third bounding box edge of the subject object and a bounding box edge of the third candidate reference object; and
the means for displaying further includes means for displaying, in response to the first distance and the third distance being approximately equal, equal spacing smart guides indicating that the subject object is approximately equidistant from the first candidate reference object, the second candidate reference object, and the third candidate reference object.

* * * * *